US011856260B2

(12) United States Patent
Holm et al.

(10) Patent No.: US 11,856,260 B2
(45) Date of Patent: Dec. 26, 2023

(54) APPLICATIONS, SYSTEMS AND METHODS TO MONITOR, FILTER AND/OR ALTER OUTPUT OF A COMPUTING DEVICE

(71) Applicant: Covenant Eyes, Inc., Owosso, MI (US)

(72) Inventors: Michael Holm, Ovid, MI (US); Matt Ribiero, Scottsdale, AZ (US); Scott Hammersley, Oakley, MI (US); Ronald Dehaas, Owosso, MI (US)

(73) Assignee: COVENANT EYES, INC., Owosso, MI (US)

( * ) Notice: Subject to any disclaimer, the term of this patent is extended or adjusted under 35 U.S.C. 154(b) by 1254 days.

(21) Appl. No.: 16/089,184

(22) PCT Filed: Mar. 30, 2017

(86) PCT No.: PCT/US2017/025050
§ 371 (c)(1),
(2) Date: Sep. 27, 2018

(87) PCT Pub. No.: WO2017/173100
PCT Pub. Date: Oct. 5, 2017

(65) Prior Publication Data
US 2020/0302029 A1    Sep. 24, 2020

Related U.S. Application Data

(60) Provisional application No. 62/315,348, filed on Mar. 30, 2016.

(51) Int. Cl.
*G06F 18/2113* (2023.01)
*G06F 18/241* (2023.01)
(Continued)

(52) U.S. Cl.
CPC ....... *H04N 21/454* (2013.01); *G06F 18/2113* (2023.01); *G06F 18/241* (2023.01);
(Continued)

(58) Field of Classification Search
CPC ...... G06F 21/10; G06F 21/84; G06F 18/2113; G06F 18/241; G06F 21/00;
(Continued)

(56) References Cited

U.S. PATENT DOCUMENTS 7,272,853 B2 *  9/2007  Goodman ............ G06Q 10/107
                                                              726/13
8,359,642 B1     1/2013  Wurtenberger et al.
(Continued)

FOREIGN PATENT DOCUMENTS

EP    2030441 B1 *  4/2012  ....... H04N 21/44008
GB    2324669 A  * 10/1998  ........... G06T 1/0021

OTHER PUBLICATIONS

International Search Report for PCT/US17/025050, dated Aug. 1, 2017 (4 pages).
(Continued)

*Primary Examiner* — Farid Homayounmehr
*Assistant Examiner* — Mudasiru K Olaegbe
(74) *Attorney, Agent, or Firm* — Fitch, Even, Tabin & Flannery, LLP

(57)  ABSTRACT

A system for to monitor image input of a computing device having a control circuit with a programmable processor, and configured to receive images and to output the images to an image output device coupled to the computing device. The computing device can be configured to monitor the received images via the processor of the computing device being programmed using a Machine Learning Image Classification (MLIC) algorithm configured to determine a score of at least one received image within a predetermined criteria for classifying said at least one received image as a restricted subject image. Based on determination of the score, a modify or non-modify command is generated; and wherein in response to said at least one received image being scored (Continued)

by said processor within the modify criteria, the processor is programmed to generate a command to output the modified image.

20 Claims, 12 Drawing Sheets

(51) Int. Cl.
*G06N 20/00* (2019.01)
*H04N 21/454* (2011.01)
*G06F 21/10* (2013.01)
*G06F 21/84* (2013.01)
*G06N 3/084* (2023.01)
*G06T 15/50* (2011.01)
*G06V 10/764* (2022.01)
*G06V 10/82* (2022.01)
*G06V 10/44* (2022.01)
*G06V 10/94* (2022.01)

(52) U.S. Cl.
CPC .............. *G06F 21/10* (2013.01); *G06F 21/84* (2013.01); *G06N 3/084* (2013.01); *G06N 20/00* (2019.01); *G06T 15/503* (2013.01); *G06V 10/454* (2022.01); *G06V 10/764* (2022.01); *G06V 10/82* (2022.01); *G06V 10/945* (2022.01)

(58) Field of Classification Search
CPC .. G06F 2221/032; G06N 20/00; G06N 3/084; G06K 9/623; G06K 9/6268; G06T 15/503; H04N 21/454; H04N 21/4662; H04N 21/44008; H04N 21/4532; G06V 10/454; G06V 10/764; G06V 10/82; G06V 10/945
See application file for complete search history.

(56) References Cited

U.S. PATENT DOCUMENTS

| | | | | |
|---|---|---|---|---|
| 9,741,161 | B2* | 8/2017 | Schroecker | G06T 7/0012 |
| 2002/0073421 | A1* | 6/2002 | Levitan | H04N 21/4532 |
| | | | | 348/E7.063 |
| 2002/0147782 | A1* | 10/2002 | Dimitrova | H04N 21/4394 |
| | | | | 709/207 |
| 2009/0128573 | A1* | 5/2009 | Lambe | H04L 63/10 |
| | | | | 345/530 |
| 2009/0274364 | A1* | 11/2009 | Shakya | G06V 20/40 |
| | | | | 382/165 |
| 2011/0047388 | A1* | 2/2011 | Park | G06F 21/6209 |
| | | | | 380/283 |
| 2011/0221919 | A1* | 9/2011 | Zhang | G06F 3/0416 |
| | | | | 348/222.1 |
| 2013/0070986 | A1* | 3/2013 | Peleg | G06K 9/6254 |
| | | | | 382/128 |
| 2014/0118239 | A1* | 5/2014 | Phillips | G06F 3/1454 |
| | | | | 345/156 |
| 2014/0207450 | A1* | 7/2014 | LaVoie | H04N 21/8456 |
| | | | | 704/235 |
| 2015/0020190 | A1 | 1/2015 | Lee et al. | |
| 2015/0023552 | A1* | 1/2015 | Rosen | G06Q 30/0276 |
| | | | | 382/103 |
| 2015/0065803 | A1* | 3/2015 | Douglas | G06T 7/143 |
| | | | | 600/200 |
| 2015/0100977 | A1 | 4/2015 | Shieh et al. | |

OTHER PUBLICATIONS

Extended European Search Report for corresponding International Application No. EP 17 77 6663 dated Jul. 24, 2019.
Strasser, J. et al., Multi-layered Image Caching for Distributed Rendering of Large Multiresolution Datasets, Eurographics Symposium on Parallel Graphics and Visualization (2006), Alan Heirich, Bruno Raffin, and Luis Paulo dos Santos (Editors).

* cited by examiner

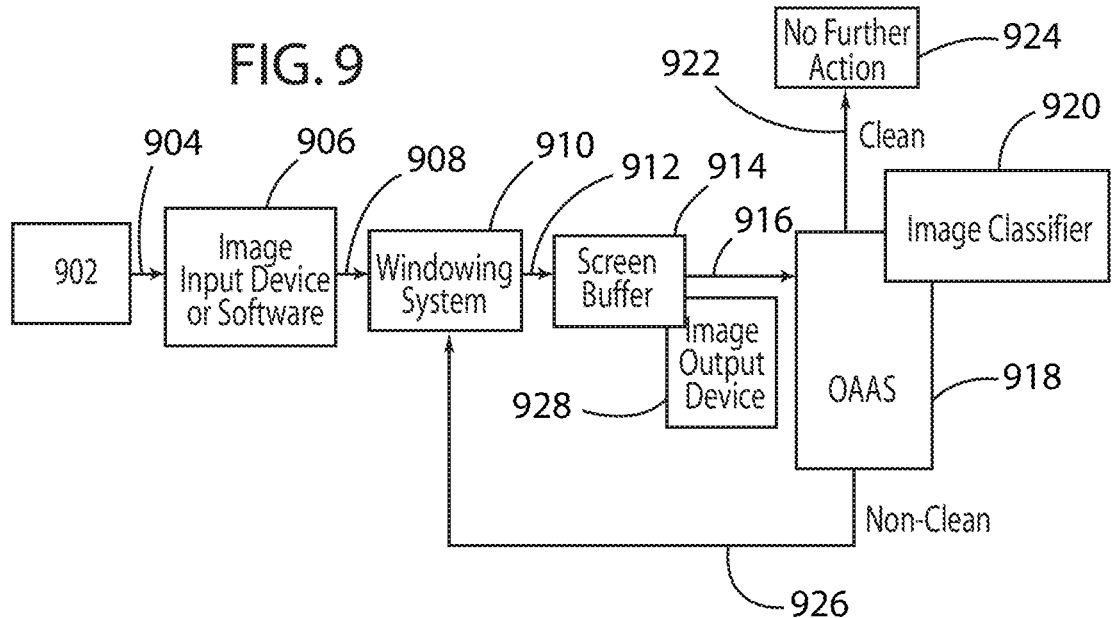
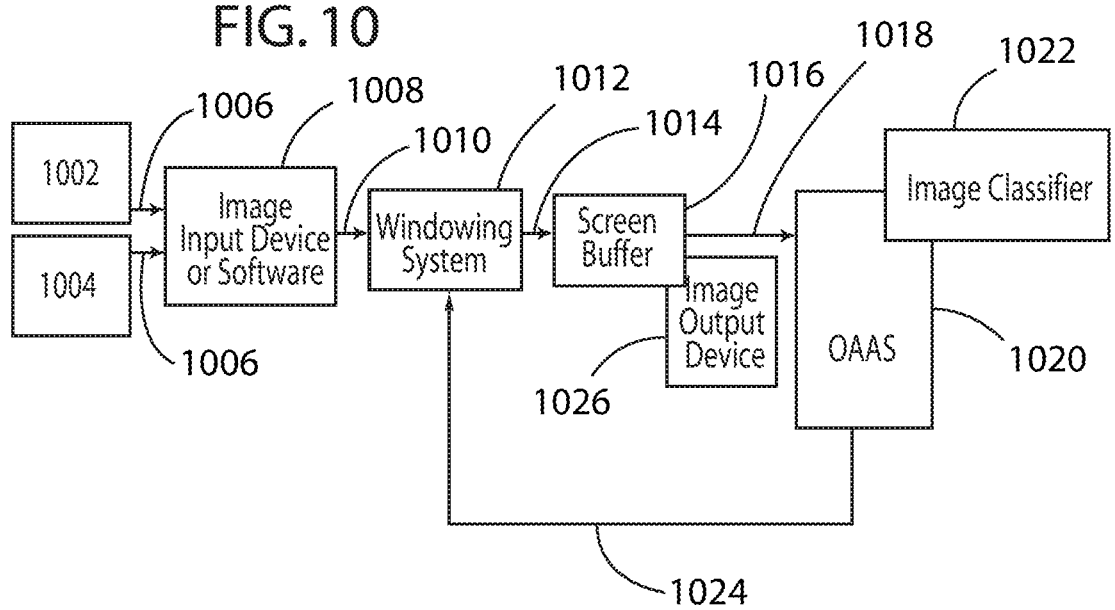

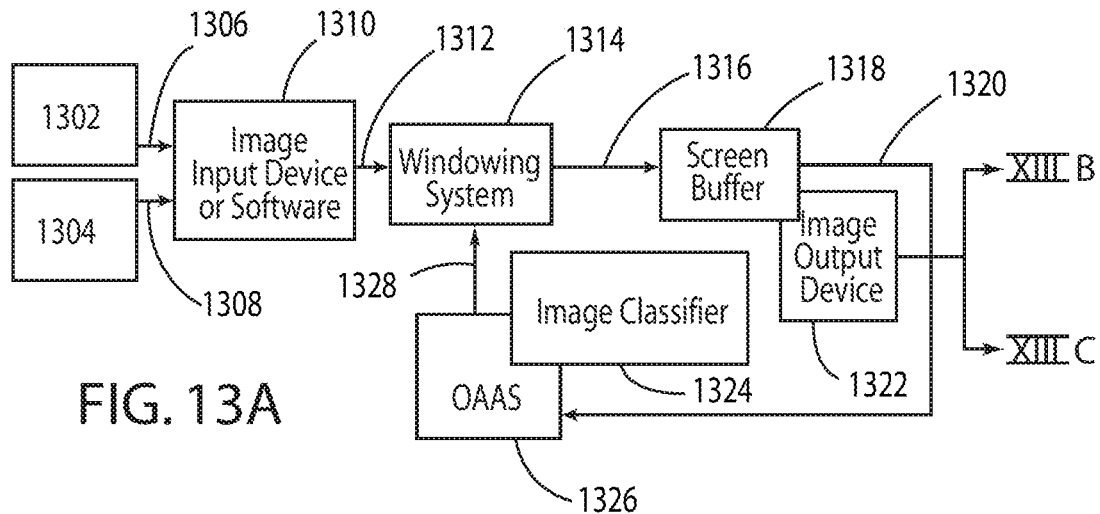
FIG. 13A
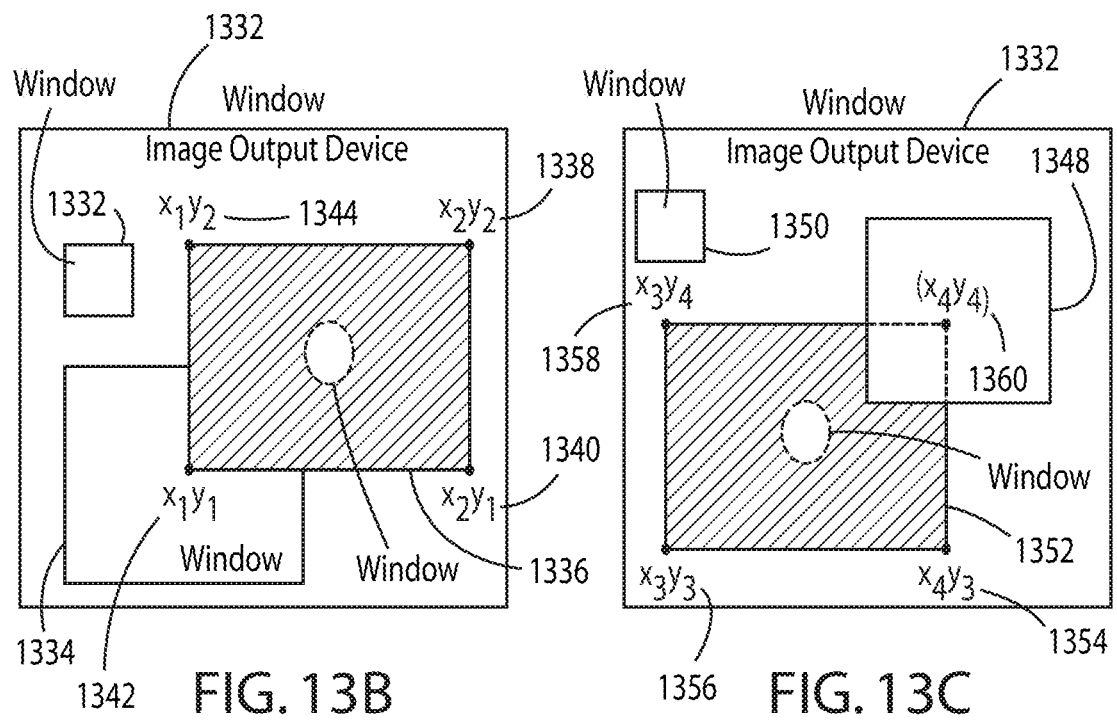
FIG. 13B
FIG. 13C

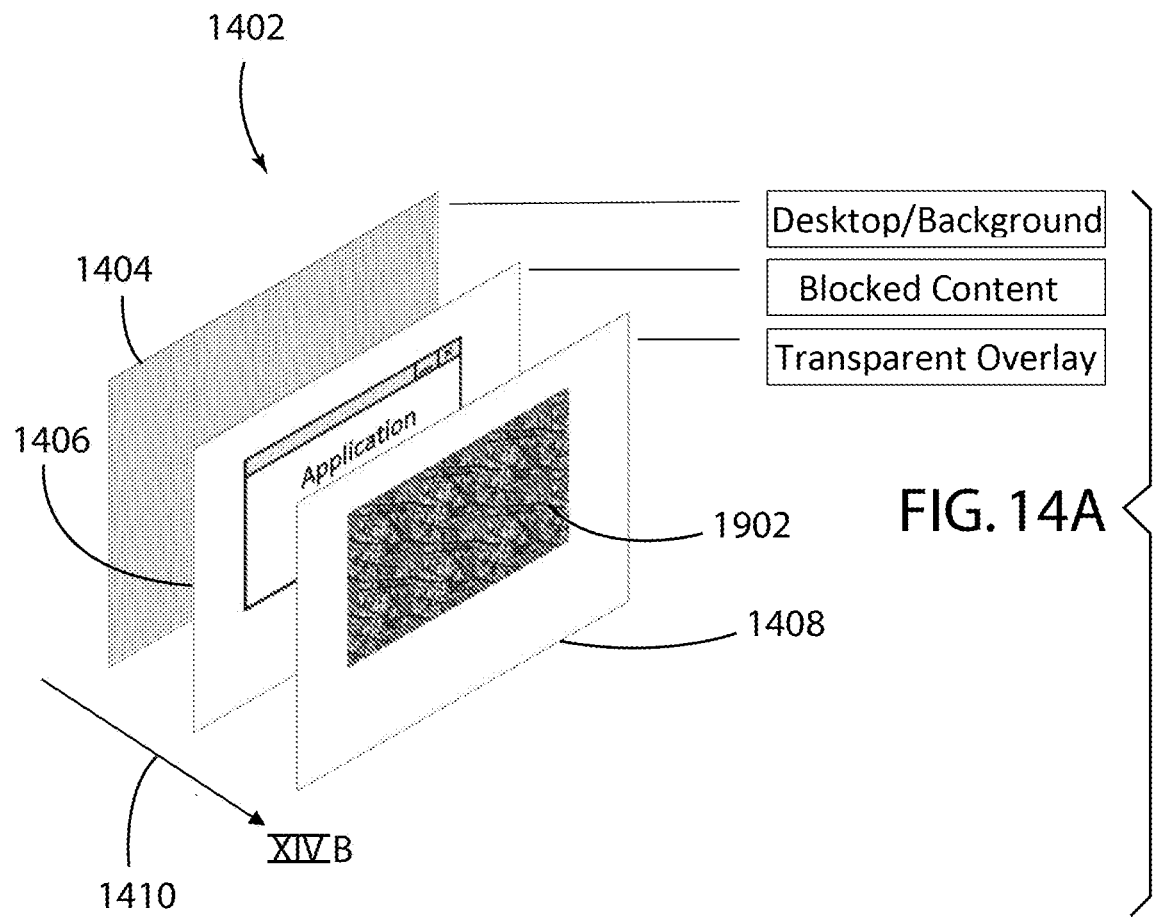
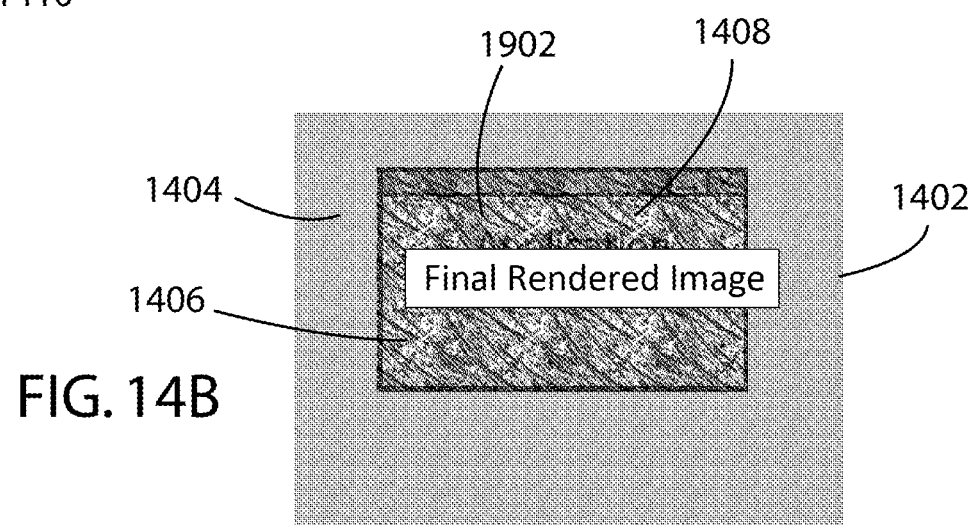

25% Alpha Blend

75% Alpha Blend

95% Alpha Blend

Original/Restored Image

APPLICATIONS, SYSTEMS AND METHODS TO MONITOR, FILTER AND/OR ALTER OUTPUT OF A COMPUTING DEVICE

CROSS-REFERENCE TO RELATED APPLICATIONS

This application is a U.S. national phase application filed under 35 U.S.C. § 371 of International Application No. PCT/US17/025050, filed Mar. 30, 2017, designating the United States, which claims priority from U.S. Provisional Patent Application No. 62/315,348, filed on Mar. 30, 2016, the content of each of which are hereby incorporated by reference in their entirety.

FIELD

The present disclosure generally relates to applications, systems and methods ("systems") to monitor, filter and/or alter the output of a selected processing or computing device to which it may be installed, and more particularly to systems configured to monitor images (such as web browsing in real time, file sharing programs, news groups, chat rooms, peer to peer chats, file transfer protocols, emails sent and received, videos, DVD's, photographs, 3-dimensional virtual images, and the like, as well as offline image access activities such as images stored on the device, pictures taken by the device, and the like) of a selected device and upon reaching a predetermined threshold event/value, altering the device output, such as to modify, obscure and/or block visual and/or audio output and optionally to remove select content from the device memory and to optionally remove the image modification upon reaching a prescribed threshold event.

BACKGROUND

It is often desirable and sometimes necessary to limit a person's access to the visual (or audio) output of a computing device. For example, it may be desirable to block material that is predetermined to be inappropriate or objectionable for a user of a computing device. However, this is often not possible as a practical matter.

For example, an image viewing policy may determine that certain images or types of images violate the policy and that the image should/must be modified, obscured, or blocked. Accordingly, when a device processes visual content which violates that policy, there is a desire and need to control what is actually observed by the user (i.e., the visual or audio output of the device). Such control can be to modify and/or obscure the violating image such that the viewer has limited, or no ability to see the original image. However, a challenge exists in the art for the device to still be able to continuously monitor original image input (such as video playback in real time) for analysis, reporting, or for the purposes of influencing future actions such as turning the device off, modifying output images and/or audio, generating an alarm event, generating a report, and the like.

Although there are known limited systems in the art to block and/or monitor some activities in some computing devices, there is a desire and need in the art to provide a computing device that uses blocking and/or monitoring methods, systems or applications, which can continuously monitor content processed in a device to continuously control device output to predetermined output events.

SUMMARY

The present disclosure generally relates to applications, systems and methods ("systems") to monitor, filter and/or alter the output of a selected processing or computing device to which it may be installed, and more particularly to systems configured to monitor images (such as web browsing in real time, file sharing programs, news groups, chat rooms, peer to peer chats, file transfer protocols, emails sent and received, videos, DVD's, photographs, 3-dimensional virtual images, and the like, as well as offline image access activities such as images stored on the device, pictures taken by the device, and the like) of a selected device and upon reaching a predetermined threshold event/value, altering the device output, such as to modify, obscure and/or block visual and/or audio output and optionally to remove select content from the device memory and to optionally remove the image modification upon reaching a prescribed threshold event.

According to one approach a system for monitoring image input of a computing device is provided having a computing device including a control circuit having a programmable processor, the computing device being configured to receive images and to output the received images to an image output device coupled to the computing device; wherein the computing device is configured to monitor the received images via the processor of the computing device being programmed using a Machine Learning Image Classification (MLIC) algorithm configured to determine a score of at least one received image within a predetermined criteria for classifying said at least one received image as a restricted subject image, and, wherein said processor of said computing device is programmed, based on said determination of said score by said processor, to generate a modify or non-modify command with respect to said at least one received image; and wherein in response to said at least one received image being scored by said processor within the modify criteria, the processor is programmed to generate a command to output said at least one received image as a modified image to the image output device.

In one embodiment, the output of the modified image to the image output device based on said modify command by said processor can be is selected from the group consisting of altered, replaced, obscured, blocked, overlaid, and combinations thereof of the at least one received image. In another embodiment the processor can be further programmed, based on said modify command by said processor, to generate a command selected from the group consisting of: a command to modify audio output of said computing device, a command for said computing device to sound an audible alarm, a command to generate a report, a command to power off said computing device, and combinations thereof. In another embodiment, the processor of said control circuit of said computing device can be programmed to continuously monitor image input and to generate a command for the image modification to cease upon a determination by said processor that said at least one received image scored within the modify criteria.

In another embodiment, the score determined by said processor of said control circuit of said computing device can be at least one of a relative, numerical, alphabetical, and/or symbolic score.

In another embodiment, the score determined by said processor of said control circuit of said computing device can be numeric and scaled from 0 to 100, and wherein said processor of said control circuit of said computing device can be programmed to issue said modify command when said at least one received image is scored above a predetermined score between 0 and 100.

In another embodiment, the received image can be selected from the subject domains of pornography, medical imagery, diagnostic imagery, seismic data, or from any other subject domain.

In another embodiment, the computing device can be a cluster of devices including at least one of individual computers, remote servers, other devices capable of communicating interactively with said computing device, and/or mobile devices.

In another embodiment, the received images can be at least one of still pictures, videos, streaming videos, 3-D images, holographic, virtual reality, and analog images.

In another embodiment, the received images are video images and wherein said processor of said control circuit of said computing device can be programmed to determine a score of said video images via a capture of sequential images of the video at predetermined time intervals in the range of 1 milliseconds to 10,000 milliseconds; and wherein said score for said video images determined by said processor of said control circuit of said computing device can be based on images or portions of video images preceding said captured sequential images.

In another embodiment, the processor of said control circuit of said computing device can be programmed to cause analog image data to be converted to digital data, and to analyze said digital data.

In another embodiment, the processor of said control circuit of said computing device is programmed to capture metadata associated with said received images, and wherein said processor of said control circuit of said computing device can be programmed to process said metadata via said MLIC algorithm to determine said score for said received images.

In another embodiment, the metadata includes at least one of filename, timestamp, title, description, tags, source code, and hash.

In another embodiment, the command to generate said report contains at least one of said score, metadata, image, modified image, replacement image, display of a list of recorded image access activity sorted by said score, display of a list of recorded image access activity sorted chronologically, and no image.

In another embodiment, the received images comprise at least one of: screen data; data of image files stored in the memory of said computing device; data sent from a device capable of sending images; data from an HDMI processor; data sent from a device capable of sending videos; data sent from a device capable of sending analog images; data sent from a device capable of sending n-dimensional images (where n is a number greater than 2); data sent via Internet; data sent via Intranet; data from a camera; data from another computing device; data from a remote server; data from a Virtual Private Network; and data from a scanner.

In another embodiment, the MLIC Algorithm is a convolutional neural network (CNN).

According to another approach, system for monitoring, obscuring and recovering images available for viewing by a selected user, is provided, the system having a computing device having an obscuring and analysis system (OAAS) installed thereon, said computing device having at least one image input device configured to receive images and one image output device configured to output the received images to be viewed by said user; an image classifier installed on the computing device and configured to classify the received images as one of clean and non-clean; wherein said OAAS is configured to generate one or more controlled images and to cause at least one of said input images classified by said image classifier to be non-clean to be obscured by said one or more controlled images, said controlled images being displayed for viewing by said user via said image output device while said at least one of said input images classified by said image classifier to be non-clean is not visible to said user via said image output device; and wherein said controlled images contain content which enables said OAAS to execute at least one of: recovery of said received input images; and transmission of metadata associated with said input images to a reporting agent.

In another embodiment of this approach, the computing device is configured such that said OAAS can be included in at least one of: the operating system of said computing device; and a chip embedded in said computing device.

In another embodiment, the OAAS is configured to permit some of the received images to not be obscured by said controlled images, based on at least one of: a classification of said receive images by said image classifier; a predetermined schedule based on time; and a predetermined schedule based on number of input images.

In another embodiment, the computing device includes a windowing system, said windowing system being configured to include a process of assigning z-order to windows which are to be displayed for viewing; wherein said OAAS is configured to generate said one or more controlled images via an alpha blending process; wherein said windowing system is configured to assign to said received input image classified by said image classifier to be non-clean a position in said z order; wherein said OAAS is configured to cause said windowing system to replace said received input image classified by said image classifier to be non-clean in said z-order by said controlled image; wherein said OAAS is configured to cause said windowing system to display said one or more controlled image as a topmost window; wherein said OAAS is configured to recover said receive input images via a reverse alpha-blending process, wherein said future actions include the OAAS causing at least one of: turning said computing device off; sounding an alarm; obscuring the next image; obscuring a predetermined number of next images; obscuring next images for a predetermined time; allowing the unobscured display of next image; allowing a predetermined number of next images; allowing the next images for a predetermined time; and sending content about analyzed images to a reporting agent; and wherein said reporting agent generates a report on the image and wherein said report includes at least one of: metadata about the image; the input image; the controlled image; and results of analysis by OAAS.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The foregoing features, as well as other features, will become apparent with reference to the description and figures below, in which like numerals represent like elements, and in which:

FIG. 9 illustrates an exemplary system according to the present embodiments, depicting actions taken for a clean image following an image classified as non-clean.

FIG. 10 illustrates an exemplary system according to the present embodiments, depicting actions taken when an image that is non-clean follows an image that is non-clean.

FIG. 13A illustrates one exemplary process of alpha-blending and reverse alpha-blending as used in some of the present embodiments.

FIG. 13B is a schematic illustrating an embodiment where the windowing system causes the resulting controlled window (in this case, a rectangular window, though in some embodiments the window is non-rectangular) to be the topmost window in the z-ordering process of the windowing system.

FIG. 13C illustrates an embodiment where the windowing system causes the resulting controlled window (in this case, a rectangular window, though in some embodiments the window is non-rectangular) to be the topmost window in the z-ordering process of the windowing system.

FIG. 14A illustrates an example of a z-order of a windowing graphical user interface illustrating multiple stacked windows and obstruction of a blocked application by a partially transparent overlay window using alpha blending in accordance with some embodiments.

FIG. 14B illustrates an exemplary final rendered Image of the z-ordered stacked windows of FIG. 14A in accordance with some embodiments.

FIG. 15A illustrates an exemplary final rendered image with 95 Percent Alpha Blend in accordance with some embodiments.

Figure 1:
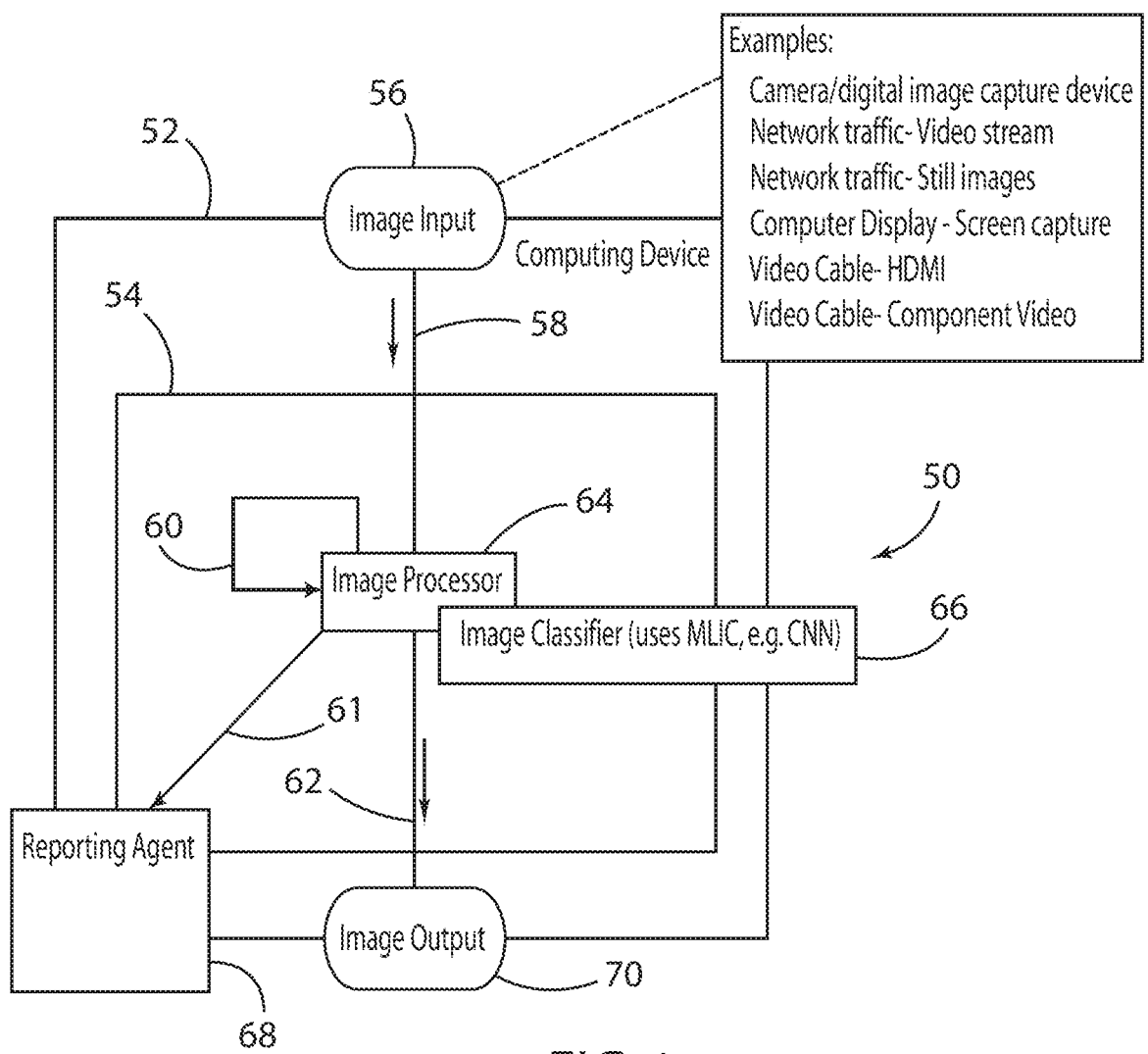
FIG. 1 is an overall schematic of an exemplary system for filtering and/or altering image input by a computing device according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

The following is a glossary of some of terms used in this disclosure:

Algorithm Ensemble: The combination of multiple algorithms on a single problem to achieve greater results than possible by any individual component algorithm.

Alpha Blending: (equivalent to alpha blending): Alpha blending is the process of combining a translucent foreground (or overlay) image with a background (or underlying) image, thereby producing a new blended image. The degree of the foreground image's translucency may range from completely transparent to completely opaque. If the foreground image is completely transparent, the blended image will be the background image. Conversely, if it is completely opaque, the blended image will be the foreground image. Of course, the translucency can range between these extremes, in which case the blended image is computed as a weighted average of the foreground and background colors. Alpha blending, for the purposes of this application, may be accomplished using a mathematical process that can be reversed.

Block: To prevent an image, image stream or media application from displaying on a user's media device. In some embodiments said "prevent" may include the replacement of the image by another, or no, image.

Clean: An image that may contain a spectrum of related characteristics, ranging from one extreme (for example, A) to another extreme (for example, Z) wherein the proximity on the spectrum being close to A (with "close" being user- or system-defined) is considered worthy of a blocking process and/or a reporting process and wherein the proximity on the spectrum being close to Z (with "close" being user- or system-defined) is considered worthy of the image being forwarded directly to the image output device. In some embodiments, one extreme (the extreme that is blocked or reported) of the spectrum is a characteristic that is considered objectionable by or to the user, as dynamically controlled by a user-governed threshold and as determined by an image classification algorithm. In some embodiments said threshold is imposed on the user by a third party.

Computer program or computer program product in the present context means any expression, in any language, code or notation, of a set of instructions intended to cause a system having an information processing capability to perform a particular function either directly or after either or both of the following: (a) conversion to another language, code or notation, and (b) reproduction in a different material or electronic form.

Controlled Image: An image that is caused to be generated by, or is generated by an Obscuring and Analysis System (OAAS) intended to be viewed by a user of a selected computing device, but which is a replacement, or an alpha-blended obscured image, such that the original image is blocked, modified, or obscured.

Convolutional Neural Network: A convolutional neural network (CNN) is a type of feed-forward neural network in which neurons are locally banded together to simulate the visual receptive field. A CNN model learns low to high level features from the raw information encoded in training samples by optimizing shared-weight filters through the model's layer sequence via the gradient back-propagation algorithm. Typical CNN model layers include convolution layers, pooling layers, non-linear activation layers, fully-connected layers and loss layers. In addition to the core architecture, a large collection of complementary strategies have emerged to take greater advantage of the power of CNN models, such as stochastic neuron dropout, parameter regularization, and more effective back-propogation parameter update rules. (See attached article for more details)

Filter: Sometimes used as a synonym for "block" or "obscure" but may also refer to the process of analysis used to determine whether or not to allow the display of an image, website, application, or other information that could be viewed through use of an output device.

Framebuffer (also referred to as screen buffer): A framebuffer (or frame buffer) is a portion of RAM containing a bitmap that is used to refresh an image or video display from a memory buffer containing a complete frame of data. In computing, a screen buffer is a part of computer memory used by a computer application for the representation of the content to be shown on the computer display. The screen buffer may also be called the video buffer, the regeneration buffer, or regen buffer for short.

Image: The numerical encoding used by a computing device capable of representing and storing raw pixel information composing visual media, such as still images and video frames, both digital and analog.

Image Classifier: Any computer algorithm or hardware device which take as input an image and emits as output a label either of clean or unclean for that image.

Image Input Device: One or a composite of several hardware or software devices whose role is to feed images to the computing device. Images may typically come from an external source, such as a DVD player, camera, and Wide Area Network like the Internet, and the like. Software applications are included in that they may each generate images to be displayed by the windowing system. The image input device may also reside in the computer as an interface between the operating system of the computer and other memory contained within the computing device.

Image Output Device: A video monitor, or other device or screen to display an image. Image Output Device, may be internal to the Computing Device, or may be external to the Computing Device (e.g., a separate television or other type of external image monitor.

Machine Learning Image Classification Algorithm (MLIC): Any of a class of computer algorithms which, on the basis of mathematical features learned from a collection of reviewed sample images, each representing one of a finite number of categorical classes of interest, takes as input a digital image and emits as output a predicted class label for that image.

Modify: A general term representing any change made to an image or device audio at any point from the receipt of the image by the image input device through the display of the image by the image output device (the computing device may be configured to store input images for an indefinite time before the images are called or otherwise scheduled for display) that includes any change to an image as viewed by a person. An un-modified image could be viewed unchanged from the receipt of the image by the image input device through the display of the image by the image output device. Changes may include change in resolution, color, aspect ratio, contrast, content, and the like, as well as obscuring or blocking or filtering or replacing or any other predetermined image altering, and image removal from a device's memory.

Obscuring and analysis system (OAAS): Software or hardware installed on or in a computing device that receives an input image either from the computing device, the operating system of the computing device, or an image input device or a screen buffer, and also may receive metadata about said image. The OAAS also receives input about that image from an image classifier (said image classifier may reside in the OAAS or external to the OAAS, including on an external server; said external server may include a cluster of servers and computing devices), enabling the OAAS and/or the said image classifier to analyze a first image, make a determination as to whether or not it is "clean" or "non-clean," and if clean allowing said image to be sent to the output device, and if non-clean obscuring it using an alpha-blending process. Metadata may be used as part of that determination. In the case where the previous analyzed image was judged to be "non-clean," the OAAS is also configured such that it may automatically (that is, before it is analyzed by the OAAS) obscure a next image, by alpha-blending, and utilize the processes of the windowing system to display that obscured next image when that image is viewable on a screen. When the image has been alpha-blended, the OAAS is also configured then to reverse alpha-blend the alpha-blended image, and then perform the analysis to determine whether the background image is clean or non-clean; the OAAS is further configured such that it may use the results of that analysis to make a determination whether or not to obscure a next image. The OAAS may also be configured to output either the unmodified image or the obscured image to a windowing system, a screen buffer, a reporting agent, or a storage device or data file. The OAAS may also be configured to generate a report that may be sent to a reporting agent.

Obscure: Algorithmically alter an image to the point that medium to high level detail is not discernible. Often the image is modified in such a way that it is difficult or impossible to determine by the human eye what the original, un-modified image is. This may include alpha blending, which may include a mathematical process that allows the resulting background image to be recovered.

Online Learning: The process of improving the accuracy of an existing machine learning model (e.g. an MLIC such as a convolutional neural network model) by learning from new training examples from image traffic in real-time.

Overlay Image (equivalent to foreground image): The overlay image is an image used in combination with an underlying image during an alpha-blending process (see alpha-blending).

Primary Z-Order: The primary Z-Order is also referred to as the Topmost Window (see Topmost Window).

Region Proposal Algorithm: Given image processing algorithm A and input image I, a region proposal algorithm identifies portions of I of most probable interest to A.

Recover (as a verb, in all tenses, or the noun recovery): When used in the context of alpha blending or reverse alpha blending, to recover is to reverse the mathematical process of alpha blending in order to obtain ("unveil") the underlying image for analysis. An approximate recovery of the underlying image still constitutes recovery.

Reverse Alpha-blending (equivalent to reverse alpha blending): the process of "un-doing" the mathematical alpha blending process so as to remove the foreground image and restore the background image (potentially with some loss owing to rounding error). For the purposes of this application, the reverse alpha blending process may occur in memory for the purposes of analysis by the OAAS and never displayed to the user.

Screen: The electronic visual display system of a computing device, enabling a user to view images.

Screen Buffer: see Framebuffer.

Topmost Window: The windowing system ensures that a window with the topmost property remains above all non-topmost windows in the z-order, even if the topmost window is deactivated (i.e., it loses focus).

Underlying Image (equivalent to background image; also referred to as input image): The underlying image is the original image as received by the image input device.

User: The human media-consumer benefiting from or governing the intelligent computer vision monitor and filter system.

Windowing system: The windowing system is a type of graphical user interface (GUI) which implements Z-order of the WIMP (windows, icons, menus, pointer) paradigm for a user interface. Each currently running application is assigned a usually resizable and usually rectangular shaped surface of the display to present its graphical user interface to the user; these windows may overlap each other, as opposed to a tiling interface where they are not allowed to overlap. Usually a window decoration is drawn around each window.

Z-Order: Z-order is an ordering of overlapping two-dimensional objects, such as windows in a stacking window manager (windowing system), shapes in a vector graphics editor, or objects in a 3D application. One of the features of a typical GUI is that windows may overlap, so that one window hides or occludes part or all of another.

The present disclosure generally relates to applications, systems and methods ("systems") to monitor, filter and/or alter the output of a selected processing or computing device to which it may be installed, and more particularly to systems configured to monitor images (such as web browsing in real time, file sharing programs, news groups, chat rooms, peer to peer chats, file transfer protocols, emails sent and received, videos, DVD's, photographs, 3-dimensional virtual images, and the like, as well as offline image access activities such as images stored on the device, pictures taken by the device, and the like) of a selected device and upon reaching a predetermined threshold event/value, altering the device output, such as to modify, obscure and/or block visual and/or audio output and optionally to remove select content from the device memory and to optionally remove the image modification upon reaching a predetermined threshold event/value.

The present disclosure provides systems and methods to monitor select image access activities of a user of a selected processing device or computing device to which the system is installed, and more particularly to monitoring, filtering and/or modifying systems and methods configured to monitor and/or block multiple image access activities, such as web browsing, file sharing programs, news groups, chat rooms, peer to peer chats, file transfer protocols, e-mails sent and received, and the like.

In the art, limited means to block and/or monitor activities of computing devices are known. However, such monitoring and/or blocking attempts, which often use text or other metadata, may erroneously (either compulsorily or voluntarily) block and/or monitor the usage of the computing device (which can also include televisions and monitors) and compile an erroneous record of the web sites or channels accessed by that particular user. This record could be made available to select third party recipients automatically and at pre-determined time intervals, or access to the record may be provided to the selected third party recipient.

For example, U.S. patent application Ser. No. 2003/0130979 to Matz, et al. describes a system having a content-access-history database that includes information about actions the subscriber has taken to access certain types of content, such as television programming and the like on web sites. Although one of the embodiments states that providers may use the system for monitoring the Internet, it does not describe how the system could be adapted for such use and mainly describes the use as applied to televisions.

In some situations a computing device is subject to a policy to monitor and determine whether a user's access to view certain images, or videos, or animations, and the like ("image(s)"), which are outputted by the device display, violates the policy. When a policy violation is detected by the policy monitor, the image may, for example, be modified as defined herein. Thus, there is a desire and need to control what is actually viewed or even heard by the user (i.e., displayed by the device) in a way that modifies the original image such that the viewer has limited, or even no time viewing and/or discerning the original unmodified image(s). There is also a desire and a need to continue to monitor the original unmodified image(s), for analysis, reporting, or for the purposes of influencing future actions such as turning the device off, modifying future images, sounding an alarm, generating a report, returning the image to an unmodified state once the image is no longer in violation, and the like.

For example, some limited site specific Internet usage monitoring programs may be installed by employers or parents to monitor the web sites visited by employees or children respectively. It may also be desirable to monitor web sites accessed by other persons under a variety of different circumstances. Involuntary applications of these types of programs are often used by employers. The employee has no choice but to accept the monitoring activity on the computing device since they have no expectation of privacy for business owned systems. In a voluntary monitoring system, the user knowingly and voluntarily has the monitoring program installed on a particular computing device to monitor his Internet activities. The user may even select one or more third party recipients to receive, or have access to, a report containing a record of the Internet activity of the user. A disadvantage of many such systems is that they monitor only Internet activity, and cannot monitor images that may come from other sources, such as television or cameras. Another disadvantage of many such systems is that the methods of blocking and monitoring images they use are often highly inaccurate.

For example, U.S. Pat. No. 6,606,657 to Zilbertstein, et al., describes a system to gather and report detailed information on a user's website visitation. Here, a server system is connected to the Internet and receives, processes and supplies detailed user information such as the sites visited and the duration and times of such visits. Such information is gathered and transmitted to subscribers who have reporting and communicating software installed. In addition, the users submit profile information about themselves. Demographic information as to the popularity of visited web sites may then be easily determined, stored and updated by the server. This demographic information, in turn, may be provided to other users, or web site operators and advertisers. The embodiments disclosed also allows users to initiate chat sessions with other users visiting a particular web site, or post a virtual note on the site for other subscribers to read. A disadvantage of the teachings of Zilberstein et al. this is that most of the web monitoring information is provided to the website owners and operators, not to the users. Another disadvantage of such systems is that they monitor only Internet activity, and cannot monitor images that may come from other sources, such as television or cameras.

U.S. Pat. No. 6,449,604 to Hansen, et al. describes a system for displaying information on web page usage. Statistical information and usage analysis produced by this disclosure is available to owners and web-site operators. A disadvantage to the teachings of Hansen et al. is that it focuses on website use, not a user's usage. U.S. Pat. No. 6,052,730 to Feliciano, et al. discloses a method for monitoring web browsing activities that does not require modification or reconfiguration of client software, and does not require information from other servers. Complete tracking of a client browsing session is allowed, including detailed link usage, page visits, and the sequence in which the accessing took place. The disclosure also allows such tracking information to be generated and recorded through the use of a single server. The disadvantage to the teachings of Feliciano et al. is that the method is transparent to the client browser.

U.S. Pat. No. 6,397,256 to Chan, et al. describes a device for transmitting browser activity to a monitoring unit. The monitoring unit is remotely located from the Internet access unit and coupled to the transmission device, the monitoring unit including a display for viewing, and recording Internet activity of the Internet access unit. The system may be activated via a remote command module and may include a password protected interface on the Internet browser (via the software plug-in). Unfortunately, this system is fairly complicated in that it requires an installed transmission adapter card. Another disadvantage of such systems is that they monitor only Internet activity, and cannot monitor images that may come from other sources, such as television or cameras.

While monitoring and filtering programs currently available in the art are configured to monitor web sites accessed by the computer user, they do not offer the capability to monitor and/or modify the activities resulting from use of other image access devices and processes.

Without these capabilities a user may circumvent a monitoring program by accessing unmonitored Internet protocols, or non-Internet related image access processes.

There are known in the art image recognition programs that utilize specific characteristics about pornographic sometimes defined "as printed or visual material containing the explicit description or display of sexual organs or activity, intended to stimulate erotic rather than aesthetic or emotional feelings" (See generally, GOOGLE) or other types of objectionable images, and use those characteristics in an algorithm to determine whether an image should be blocked or not. For instance, to define potentially sexually explicit content, the percentage of flesh tone in an image can be used to determine if the image should be blocked. One disadvantage of those systems is the characteristics common to pornography that they use also are present in many other images, so the accuracy rate is very low. Another disadvantage is that they do not use a machine learning image classification algorithm (abbreviated MLIC algorithm, as defined in glossary), such as a convolutional neural network (abbreviated CNN, as defined in glossary and detailed in the attached WIKI article) to learn mathematical features from human-reviewed, raw sample images to distinguish between the classes of pornography and non-pornography, but rather use simple, human-engineered features or characteristics common in pornography to make their determination, a strategy yielding poor performance in this complex classification task. Another disadvantage is that existing systems do not provide a reporting mechanism that may use metadata about the image to inform the report. See generally, https://en.wikipedia.org/wiki/Convolutional_neural_network.

Modifying as defined herein could include completely preventing the viewing of an image identified as being potentially objectionable by various actions by, for instance, shutting the computer off, blurring the image, replacing the image with another image, or displaying no image at all. Monitoring activity could then be recorded and made available to not only the user, but also to a third party recipient.

In some of the present embodiments machine learning, artificial intelligence, and/or other methods of scoring an image for potential violation or other threshold actions can be used to determine how close the image is compared to two ends of a spectrum, a first end being referred to as "clean" (i.e., not in violation of any predetermined policy for content) and second end being "non-clean" (i.e., in violation of any predetermined policy for content). It is noted though that other classes of images are also possible within the scope of the present embodiments and this approach is provided for better understanding of the approaches possible for the present embodiment.

The present embodiments also provide systems and methods designed to modify images based on a determination of whether, for example, a website or other Internet-based data inputs should be considered as clean or non-clean. For example, a text-based analysis to make such a determination could be used as metadata for the other present embodiments, and when a website or other image is deemed to be non-clean, the image can be modified and even replaced with another image.

In some systems in the art, images are potentially initially able to be viewed by the viewer, thus defeating the purpose of most filters, since the purpose of those filters is to prevent viewing objectionable material. Such existing systems have the limitation that an image on a screen cannot easily be analyzed until it actually appears on the screen. In the event that a non-clean image (for example, a pornographic picture) is displayed, it can be viewed by the user before it is analyzed and blocked, modified, or obscured. While it is true that the blocking, modifying, or obscuring may quickly block the image, it may still be visible for a long enough time to be discerned by the user, which may be undesirable. This limitation exists for each sequential image being input to the computing device and output through an image output device such as a screen. The net effect of this limitation is that every image would be viewable and discernable for a short time before it can be blocked, modified, or obscured, thereby defeating the effectiveness of such a system.

Some embodiments provide a blocking and/or monitoring system and/or application that is utilized with and/or incorporated into a computing device that uses a blocking and/or monitoring system capable of blocking and/or monitoring and recording a variety of image access activities, irrespective of the source of those images Some of the present embodiments provide an image monitoring program capable of generating and providing a report having information that may optionally include metadata related to the above described Internet activities. According to one approach of the present embodiments, a system for monitoring Internet use of a selected computer/computing device user can include a remote server and a computing device having a monitoring program installed thereon. The monitoring program can be configured to monitor various image access activity of a computer user and/or block (filter) said image access activity. The image access activity can include access of at least one image from still images, video streams, video frames, holographic images, other 3-dimensional images, virtual reality images, and the like. A method of using a monitoring system can include the steps of a computing device user voluntarily installing a monitoring program, or alternatively having a monitoring program pre-installed on a selected computing device, recording the Image access activity, and blocking (filtering) said image and/or providing the recorded information to a third party recipient. A report may be provided that includes a variety of information and may include a plurality of portions. A blocked image may be replaced by another image, a blurred version of the image, or no image at all.

Accordingly, the present embodiments provide an image monitoring and/or blocking system and method configured to block and/or monitor and record image-access activities of a particular computing device. For example, a local computing device can be a computer, laptop, television, monitor, a mobile personal user interface unit or device, such as but not limited to a smart phone, a tablet, and other such mobile devices, and other such computing devices. Image-access activities can include still images, video streams, video frames, holographic images, other 3-dimensional images, virtual reality images, and the like, regardless of the source, and not requiring connection to a Wide Area Network such as the Internet. Current filtering and monitoring programs available in the art are limited to blocking and/or monitoring and reporting on web browsing activities.

The system and method of the present embodiments also blocks and/or provides a report on all image access activity regardless of the origin of the image; the system and method then may provide monitoring activity to a designated third party recipient. The reports may further include a link connecting reported information related to the image access.

In one embodiment of the present embodiments, a system for blocking and/or monitoring Internet use of a selected computer user can include a Computing Device. In some embodiments, the computing device has installed thereon the present embodiments, either by the user voluntarily or pre-installed on the computing device, such as one embodiment which is sold under the tradename IRIS by PikNix, Inc. The Computing Device may also have an Image Input Device and/or Image Output Device, or those devices may be external to the Computing Device (for instance, the Image Output Device may be a television). The Computing Device may also have installed a Reporting Agent, or the Reporting Agent may be part of the present system, or the Reporting Agent may be external to the Computing Device. The Computing Device may in some embodiments be a cluster of servers, computers, or other devices capable of having collectively installed the Present system. The Present system may also include an Image Processor which directs the decision-making process of the Present system. In some embodiments, the Image Processor at least in part may comprise software (method, system, and process) installed on a system including a computing device (which may be a cluster of devices), which detects and/or captures input images from a variety of Image Input Devices (see FIG. 1); and causes those images to be classified by an Image Classifier which determines if the image is "clean" (or authorized) or "non-clean" (or unauthorized). In some embodiments, if the image is clean, the system can forward the image to Output; and if the image is non-clean, determines if metadata should be collected (and if so, collects that data). Some embodiments determine if the image should be reported via the Reporting Agent, and if so causes data and/or metadata to be forwarded to the Reporting Agent. Typically, the system determines if the image should be blocked, obscured, or replaced by another image or no image; if the image is to be obscured or replaced, performs that action; and forwards the image, obscured image, replaced image, etc. to the Output Device. Some embodiments repeat the process for every detected image, or for selected images (for instance, in a video stream, the stream may be sampled every half-second) received through the Image Input Device.

In some embodiments, the Image Input Device can be one of a camera, another computing device, a remote server, and a Virtual Private Network.

In some embodiments, "clean" is simply that which may be viewed "as is" without blocking and/or monitoring. In that sense, "clean" means an image that may contain a spectrum of related characteristics, ranging from one extreme (for example, A, where A is completely non-clean) to another extreme (for example, Z, where Z is completely clean) wherein the proximity on the spectrum being close to Z (with "close" being user- or system-defined) is considered worthy of the image being forwarded directly to the output device, while being close to A (with "close" being user- or system-defined) is considered worthy of a blocking process and/or a reporting process. The threshold for "close" to A or Z can vary based on one or more criteria, such as but not limited to an identified source of content, a user, recent blocking history, type of content, numbers of images detected in the content, image quality, other such criteria or a combination of two or more of such criteria. In some embodiments, the source of an image may be previously-known to contain only "clean" images (a whitelisted source) or previously-known to contain some "non-clean" images (a blacklisted source). In some embodiments, this determination may be based on a historical human review of the source (including but not limited to crowdsourced lists of websites) or other automated review techniques, such as natural language processing. Some embodiments may apply an automated feedback process where sources may become white or black-listed due to historical scoring of images found repeatedly at said sources. In some embodiments, where user preferences are known, the user may set a sensitivity level which enforces either stricter or more liberal thresholds for image classification scoring (i.e. the MLIC algorithm's confidence that the image belongs to one particular class; e.g. "clean"). In some embodiments, when multiple images from a single source are detected (e.g. images on a webpage), these images can be scored separately, and the presence of multiple "non-clean" images will result in a high confidence that the source is worthy to be blocked or reported upon. The determination and continual optimization of the relative weight given to each criteria and the process of combining these together, with the potential of performing short-circuit evaluation to improve computational speed in some embodiments, is the result of, for example, significant human-driven, iterative testing using known best practice quality assurance testing techniques. The MLIC according to one approach does not depend on local area networks (LANs), wide area networks (WANs), or Internet protocols. The MLIC can work on images no matter what the source.

In some embodiments, one extreme (the non-clean, or extreme that is blocked or reported) of the spectrum can be a characteristic that is considered objectionable by or to the user, as dynamically controlled by a user-governed threshold and as determined by an image classification algorithm.

In some embodiments said threshold can be imposed on the user by a third party.

In another embodiment, a method of monitoring image access of a selected computing device user may include the steps of: a monitoring program being active on the computing device (e.g., a user voluntarily installing), and the program configured to monitor Image access activity of the user. In some instances, the Image access activity may include one or more of a still image, video content, video frames, holographic images, other 3-dimensional images, virtual reality images, other such content, or combination of two or more of such content. Similarly, in some applications, the image access activity may include at least one image from the group consisting of still images, video streams, video frames, holographic images, other 3-dimensional images, virtual reality images, and the like; monitoring the Image access activity. Further, some embodiments record the Image access activity on a first database located within a remote server.

In yet another embodiment, a system for reporting Image access activity of a selected computing device user may include a remote server and a computing device communicatively connected to the remote server, the remote server having a monitoring program installed thereon. The monitoring program is configured to monitor Image access activity of the computing device user and record the activity on the remote server. The Image access activity includes access to one or more still images, video streams, video frames, holographic images, other 3-dimensional images, virtual reality images, and the like. The remote server may be further configured to generate a report including a plurality of portions, and each portion containing a list of the recorded Image access activity of one of the image access protocols. The portions may further include a computing device link to connect to another of the plurality of portions.

In still another embodiment a method of reporting Internet use of a selected computing device user may include the steps of: an image blocking and/or monitoring program activated on the computing device (e.g., a user voluntarily installing), or alternatively having the image blocking and/or monitoring program pre-installed, the program being configured to block and/or monitor Image access activity of the user; monitoring the Image access activity; generating a report of the Image access activity, the report including a plurality of portions; and providing a link on one portion of the report to electronically connect to at least one other portion of the report. In some instances, one or more of the plurality of portions can contain information on image access of different image types and sources.

In some embodiments, the Image Classifier may implement a known MLIC algorithm, such as a Convolutional Neural Network (CNN, defined in glossary). The system implementer executes a known sequence of steps to train the MLIC algorithm, of which the following is an example: In some embodiments, the system implementer procures a list of clean web-search terms and pornographic (i.e., non-clean) web-search terms (e.g. 1,000 each). The implementer may then employ known web-scraping techniques to collect image samples for each clean and non-clean term (e.g. 1,000 images per term). In some embodiments, the system implementer is provided with sets of clean and non-clean images which are predetermined as being of the classes "clean" or "non-clean" (e.g., a set of images may be purchased from a third-party vendor). In some embodiments, a system of crowd-sourcing is used to provide the system implementer with sets of clean and non-clean images which are predetermined as being of the classes "clean" or "non-clean." Finally, the systems and methods may be configured to allow, for example, a human to visually review (or other automated review techniques) each of the gathered images to verify their correct membership in their respective class of clean or non-clean, the remainder being discarded. The implementer then trains the MLIC algorithm (e.g. CNN model) on the resulting human-reviewed (or other automated review techniques) sample image sets (e.g. 1,000,000 images per class) using known procedures (in the embodiments using CNN, ref. CNN article).

In still another of the present embodiments, the present systems and methods for monitoring and/or filtering images of a selected computing device user uses a MLIC algorithm (e.g. CNN), wherein "non-clean" can mean pornography and "clean" can mean not pornography. In this embodiment, information is provided to the Reporting Agent using known computer communication remote procedure call techniques (such as REST). This information may include the image, an obscured image, a replacement image, a reduced-size interpolated image, or no image at all, and may also include metadata such as timestamp, user ID, the mac address or other identifying characteristics of the Computing Device of the selected user, titles, or other metadata. In some embodiments this results in the Computing device generating or causing to be generated a report of the Image access activity, the report including a plurality of portions; and providing a link on one portion of the report to electronically connect to at least one other portion of the report, wherein each of the plurality of portions contain information on image access of different image types and sources. Report links provide further detail about the Image or Image access activity. These include but are not limited to a link to view the image from its original source (e.g. a URL), and a link to a different part of the report that has more extensive metadata about the Image or Image access.

In still another of the present embodiments, the Present system can distinguish not only between the classes of clean and non-clean, but also one or more additional classes. For example, characteristic "clean" and "non-clean" may be two classes, but there may be a desire to consider proximity to another class such as "Yellow." In this embodiment, two or more sets of "clean" vs. "non-clean" vs. "yellow" spectra are generated and processed individually (either serially or in parallel within the present system); specifically in one embodiment, the spectra are two or three spectra of the group of classes including clean—yellow; yellow—non-clean; and clean—non-clean. The resulting analysis of each of these spectra are weighted to provide a final analysis for the Image Classifier and the Reporting Agent. Analyses that include more classes could have corresponding more spectra analyzed by the present system.

In still another embodiment, Present system distinguishes not only between the two classes of clean and non-clean, but also one or more additional classes. For example, in addition to clean and non-clean (e.g., pornographic), there may also be a desire to identify a third class of images such as "scanty lingerie." In this embodiment, the system implementer may collect a set of, for example, human-reviewed, or otherwise acquired, sample training images for the class "scanty lingerie" and retrain, in a similar manner, the MLIC algorithm (e.g. CNN model) jointly on the three image training sets for the expanded set of classes clean, scanty lingerie and non-clean.

In still another embodiment, the present system may receive an image directly from a Screen Capture Processor (that is, the numerical encoding used by the screen used by the user to view the image, said numerical encoding used by the screen to represent, store, and display the raw pixel information comprising visual media, such as still images, video streams, video frames, holographic images, other 3-dimensional images, virtual reality images, and the like). Screen capture is performed by sequentially calling high performance graphical API's provided by the operating system, such as the DirectX GetFrontBufferData( ) function on Windows operating systems. In a windowing system (https://en.wikipedia.org/wiki/Windowing_system), a single screen capture may display images from multiple applications simultaneously, where each application manages the content displayed in its top-level windows (see top-level in https://en.wikipedia.org/wiki/Root_window). The Screen Capture Processor identifies what top-level windows are visible using the operating system's graphical user interface API to determine 2-D Cartesian location, z-order (https://en.wikipedia.org/wiki/Z-order) of top-level windows, and visibility attributes. It then classifies the content of each visible window as a separate Image, and will report and block images according to the application that displayed it. In virtual reality, augmented reality or other 3-dimensional environments, the concepts of Z-order and top-level windows may be replaced by avatars, widgets, or other objects rendered in 3-dimensional space.

In still another embodiment, if an incoming image is determined to be non-clean, it is blocked, wherein said "blocked" image may include specific actions such as turning the computing device off, blocking the means of access to said image (for instance, terminating, suspending, or minimizing the application from which it came), obscuring the image before passing on to the Image Output device or method (for example, displaying it on the screen), replacing the image with a different image, or not displaying any image at all. In some embodiments, turning off the computing device is performed using the operating system's power API, such as the InitiateSystemShutdown function in the Windows API. In some embodiments, terminating or suspending an application is performed using the operating system's process API, such as TerminateProcess or SuspendThread in the Windows API. In some embodiments, minimizing an application's window is performed using the operating system's GUI API, such as ShowWindow in the Windows API. In some cases, the Image to be blocked belongs to a kernel-level or system-level process where suspension of such process could cause system instability. Specific actions in this case may include suspending all graphical processing by hiding the image under a system-level modal window (https://en.wikipedia.org/wiki/Modal_window), or rebooting the operating system. In some embodiments, where access to the image source is possible such as when the image is transmitted over a network, the image can be blurred, replaced, or removed prior to transit to the application. The process to do this can include, in some implementations, performing a known in the art man-in-the-middle tactic or web browser extensions to retrieve the image, then using a graphical API to modify the image such as the OpenCV GaussianBlur function.

In still another embodiment, if an incoming image is determined to be non-clean, other metadata may be collected about the image, such as timestamp, source, title, other textual information, other images viewed within a specified time, and the like. The information available for collection along with the process to collect will depend on the Image source. In the case of an Image retrieved over a network, metadata related to the connection (e.g. URL) can be collected. Image metadata such as title and tags may be present in the HTML surrounding the link to the image. This information can be collected by parsing the HTML using known in the art HTML parsers or using the API exposed by the web browser to a browser extension. Screen Capture Image data can include information about the application that the was found in such as the executable filename, application title using process and GUI APIs such as GetModuleBaseName and GetWindowText in the Windows API. In some embodiments, such as an HDMI Image source, metadata collected by the system relates to properties of the Image such as resolution and the environment such as the current time and date. Said metadata can then be sent to the Reporting Agent. The image itself, or a blurred version, or a replacement version may also be sent at the same time to the Reporting Agent.

In still another embodiment, the present systems and methods can receive the image directly from the Screen Capture Processor (that is, the numerical encoding used by the screen used by the user to view the image, said numerical encoding used by the screen to represent, store, and display the raw pixel information comprising visual media, such as still images, video streams, video frames, holographic images, other 3-dimensional images, virtual reality images, and the like).

In still another embodiment, the present systems and methods may receive video streams, video frames, holographic images, other 3-dimensional images, virtual reality images, and the like, and samples only a portion (for instance, in a video stream, sampling interval may be every half-second).

In still another embodiment, the image may be analog rather than digital image. In that case, the Present system may convert the analog data to digital data by means of mathematical processes such as a Fourier or LaPlace transform, and then completes its method and process using that digital data.

In some embodiments the "human viewing" (or other automated review techniques) may be performed by a third party source, who would then generate a database, which may available (e.g., for purchase) to assist the present embodiments to determine user defined parameters (for example, "clean" or "non-clean").

Other applications of the present systems and methods are possible. For example, the present systems and methods may be used as an aid in interpreting seismic data for oil and gas exploration; in that embodiment, "clean" could be identified to represent the locations of known oil wells, and "non-clean" to represent the locations of dry holes. For another example, the present systems and methods may be used as an aid in interpreting images acquired by known medical tests (e.g., x-ray, positron emission tomography, ultrasound, magnetic resonance, and the like); in those embodiments, "non-clean" could be identified to represent the presence of specific medical conditions (e.g. cancer, broken bones, infection, and the like), and "clean" to represent the absence of those conditions.

In still another embodiment, the Image Input device may have a queue of images, such that another image is available for processing by the Present system before the Image Processor completes its decision-making process; in some such embodiments, when the Image Processor determines to block and replace its current image, the next image may be evaluated by the Image Processor, and if the next image is acceptable for viewing, the current image can be replaced with the next image. In some such embodiments, for instance, a search engine that displays multiple images on a page, said images being distinct and possibly coming from different sources or devices, the individual pictures displayed on a page could be determined in part by the present systems and methods. Images in a web search can be removed through active participation of a web browser extension to remove blocked elements from a page using the API exposed by the web browser, or by modifying the page contents (e.g. the HTML) en route to the browser by using a man in the middle tactic, VPN, or proxy.

The present embodiments specifically relate to an image monitoring system and method for monitoring and recording image access of a particular computer user including one or more images, still images, video streams, video frames, holographic images, other 3-dimensional images, virtual reality images, and the like, and blocking said image and/or providing a report to a third party recipient. This type of blocking and/or monitoring, when voluntarily initiated, may provide a user a method to minimize temptations to engage in Image access activities considered objectionable to the user. If the user knows a third party recipient will have access to a report of his Image access activity, thus eliminating the secrecy of the activity, he may refrain from such activity.

The present embodiments also provide reporting features superior to existing monitoring programs thus enhancing its usefulness and effectiveness. The report generated in the present embodiments is capable of reporting the Image access activity of the user and may also provide a link on one portion of the report to allow the user to computer link to and access information related to image access activities on different portions of the report.

The present methods and systems can be understood by the description of the exemplary embodiment described below and in the figures. In general, present methods and systems, can be understood as an Intelligent Computer Vision System and Method for Monitoring and/or Filtering Images of a Selected Computer User. This is a novel technology product to monitor and/or filter visual media content using a machine learning image classification algorithm (Abbreviated MLIC algorithm, as defined in glossary), such as a convolutional neural network (CNN), in real time. Specifically, this system provides a comprehensive, user-governed architecture to accurately and efficiently capture, identify, filter and/or report objectionable visual content in the user's media stream.

Specific examples are provided to demonstrate some of the preferred features of the present embodiments. According to a first exemplary approach, systems and methods for monitoring use of a selected user, may have a computing device having an image monitoring software installed thereon; wherein said computing device is capable of displaying images on a screen; wherein said image monitoring software includes a Machine Learning Image Classification Algorithm (MLIC); wherein said (MLIC) is configured to determine, by means of a score for images, proximity to either extreme of a spectrum ranging from clean to non-clean (e.g., non-pornographic to pornographic); wherein images captured by said image monitoring software are scored based on their relative position on said spectrum; wherein said score having a specified proximity to one of said extremes results in specific actions that include at least one of: information about said image being sent to a reporting agent; and blocking said image.

According to this approach, the score can be scaled from 0 to 100, with 0 being yes and 100 being no, or 0 being no and 100 being yes. According to this approach, the reporting agent may cause a report to be displayed. According to this approach, the specific actions may be sent to a remote device which is able to perform further actions. According to this approach, the remote device may be another computing device. According to this approach, the specific action may be to send a report to said remote device. According to this approach, user of said remote device may perform the action of blocking Internet access on said computing device. According to this approach, a user of said remote device may perform the action of turning off said computing device. According to this approach, specific actions may be taken before said images or videos are displayed by said computing device. According to this approach, said image monitoring software may be installed by the user. According to this approach, the image monitoring software may come pre-installed on the device. According to this approach, image monitoring software may come pre-installed on the device includes an option for a user toggling the activity of the image monitoring software between "off" and "on." According to this approach, the computing device may be a cluster of devices including at least one of individual computers, remote servers, other devices capable of communicating interactively with said computing device, and/or mobile devices. According to this approach, the image monitoring software may be installed on the remote server. According to this approach, the score may be at least one of a relative, numerical, alphabetical, and/or symbolic score. According to this approach, the images may be at least one of still pictures, videos, streaming videos, 3-D images, holographic, virtual reality, and analog images. According to this approach, the videos may be analyzed by capturing sequential images of the videos at predetermined time intervals and said scored includes an adjustment to said score based on images or portions of videos immediately in time preceding said displayed images. For example, and throughout this document the reference to the term 'immediately' is preferably 1 second or less; more preferably between 10 milliseconds to 1 second; more preferably still, between 10 milliseconds to 10,000 milliseconds; but, also in some embodiments preferably between 1,000 milliseconds to 5,000 milliseconds. According to this approach, the videos may be analyzed by capturing sequential images of the videos at predetermined time intervals and said scored includes an adjustment to said score based on images or portions of videos immediately in time leading (that is, to be displayed in the immediate future) displayed images. According to this approach, analog data may be converted to digital by means of mathematical transforms (such as Fourier and LaPlace), and then completed by said MLIC. According to this approach, the image monitoring software may also capture metadata about the image. According to this approach, metadata may be used by the MLIC to help determine said score. According to this approach, metadata may include at least one of filename, timestamp, title, description, tags, source code, and hash from, for instance, a DVD used for cross-referencing with online movie databases. According to this approach, metadata may be at least a portion of said Information about said image. According to this approach, the information is at least one of the image itself, a blurred image, a replacement image, and no image at all. According to this approach, the reporting agent may be at least one of part of the image monitoring system, part of the computing device, and external to the computing device. According to this approach, the reporting agent may generate a report on the image. According to this approach, the report may contain at least one of said score, metadata, image, blurred image, replacement image, and no image. According to this approach, the reporting agent collects, in a database, data on more than one image and consolidates said data into one report. According to this approach, the report may display a list of recorded image access activity sorted by said score. According to this approach, the report may display a list of recorded image access activity sorted chronologically. According to this approach, the report may be available for viewing by a third party. According to this approach, the viewing by a third party may be at least one of viewing from a remote computer using a Wide Area Network (WAN) such as the Internet, having said report sent by email, having said report sent by telecommunications methods such as telephone, having said report printed out on paper, and viewing directly on said computing device. According to this approach, the report may have a plurality of parts which may contain other information, and may provide a link to other parts. According to this approach, the spectrum ranging from clean to non-clean may be the spectrum ranging from non-pornography to pornography. According to this approach, the images captured may include capturing images from at least one of: the data of the screen (the database that drives the image on the screen); the data of image files stored in the memory of said computing device; the data sent from a device capable of sending images; the data from an HDMI processor; the data sent from a device capable of sending videos; the data sent from a device capable of sending analog images; the data sent from a device capable of sending n-dimensional images (where n is a number greater than 2); data sent via a WAN such as the Internet; data sent via a LAN such as an Intranet; data from a camera; data from another computing device; data from a remote server; data from a Virtual Private Network; and data from a scanner. According to this approach, the images captured may be seismic data images used in exploration for oil and gas, and wherein said spectrum ranging from clean to non-clean is the spectrum ranging from known oil and gas-productive locations to known dry hole locations. According to this approach, the image monitoring software may be part of an Internet monitoring system such as the system operating under the tradename COVENANT EYES. According to this approach, the blocking may include at least one of: preventing any image from being viewed; blurring the image with the intention of obscuring details; replacing the image with another image; and displaying no image at all. According to this approach, other actions besides said blocking may be taken when an image is blocked, said other actions may include at least one of auditory alerts emitted from said computing device, and visual alerts displayed on said computing device. According to this approach, the computing device may have the capability to turn off or on at least one other electronic device, and in which said electronic device is turned off or on when said blocking occurs. According to this approach, the computing device may be a server or cluster of servers. According to this approach, the MLIC and the software may periodically be updated with new known images or videos. According to this approach, when more than one spectrum and more than one score of said spectra of clean vs. non-clean are individually, by at least one of a serial determination and parallel determination, processed by said image monitoring software. According to this approach, the process may include using the resulting analysis of each of said spectra, and said analysis may be weighted to provide the score, with said score being a summary of said weighted spectra. According to this approach, the images captured by said image monitoring software may include the capturing of images from a queue of multiple images, such that the image monitoring software processes more than one image at a time, by at least one of a serial determination and parallel determination. According to this approach, the blocking of the images may include replacing blocked images by at least one other image from the group of images being processed. According to this approach, the multiple images may be captured from multiple sources including from at least one of: the data of the screen (the database that drives the image on the screen); the data of image files stored in the memory of said computing device; the data sent from a device capable of sending images; the data from an HDMI processor; the data sent from a device capable of sending videos; the data sent from a device capable of sending analog images; the data sent from a device capable of sending n-dimensional images (where n is a number greater than 2); data sent via a WAN such as the Internet; data sent via a LAN such as an Intranet; data from a camera; data from another computing device; data from a remote server; data from a Virtual Private Network; and data from a scanner. According to this approach, the MLIC may be a Convolutional Neural Network (CNN).

According to a second exemplary approach, systems and methods for monitoring use of a selected user, may have a computing device having an image monitoring software installed thereon; wherein said computing device is capable of displaying images on a screen; wherein said image monitoring software includes a Machine Learning Image Classification Algorithm (MLIC); and wherein said MLIC is configured to determine, by means of a score for images, proximity to either extreme of a spectrum ranging from clean to non-clean; wherein said one extreme of said spectrum represents pornography, and the other extreme of said spectrum represents not-pornography; wherein images captured by said image monitoring software are scored based on their relative position on said spectrum; wherein said score having a specified proximity to one of said extremes may result in specific actions that include at least one of: information about said image being sent to a reporting agent; and blocking said image.

According to this second exemplary approach, the score may be scaled from 0 to 100, with 0 being pornography and 100 being not-pornography, or 0 being not-pornography and 100 being pornography. According to this second exemplary approach, the reporting agent may cause a report to be displayed. According to this second exemplary approach, specific actions may be sent to a remote device that is able to perform further actions. According to this second exemplary approach, remote device may be another computing device. According to this second exemplary approach, the specific action may be to send a report to said remote device. According to this second exemplary approach, a user of said remote device may perform the action of blocking Internet access on said computing device. According to this second exemplary approach, a user of said remote device can perform the action of turning off said computing device. According to this second exemplary approach, the specific actions may be taken before said images or videos are displayed by said computing device. According to this second exemplary approach, the image monitoring software may be installed by the user. According to this second exemplary approach, the image monitoring software may come pre-installed on the device. According to this second exemplary approach, the image monitoring software may come pre-installed on the device includes an option for a user toggling the activity of the image monitoring software between "off" and "on." According to this second exemplary approach, the computing device may be a cluster of devices including at least one of individual computers, remote servers, other devices capable of communicating interactively with said computing device, and mobile devices. According to this second exemplary approach, the image monitoring software may be installed on said remote server. According to this second exemplary approach, the score may be at least one of a relative, numerical, alphabetical, and/or symbolic score. According to this second exemplary approach, the images may be at least one of still pictures, videos, streaming videos, 3-D images, holographic, virtual reality, and analog images, the videos may be analyzed by capturing sequential images of the videos at predetermined time intervals and said scored includes an adjustment to said score based on images or portions of videos immediately in time preceding said displayed images. According to this second exemplary approach, the videos may be analyzed by capturing sequential images of the videos at predetermined time intervals and said scored includes an adjustment to said score based on images or portions of videos immediately in time leading (that is, to be displayed in the immediate future) displayed images. According to this second exemplary approach, analog data may be converted to digital by means of mathematical transforms (such as Fourier and LaPlace), and then completed by the MLIC. According to this second exemplary approach, the image monitoring software also captures metadata about the image. According to this second exemplary approach, the metadata may be used by the MLIC to help determine said score. According to this second exemplary approach, the metadata may include at least one of filename, timestamp, title, description, tags, source code, and hash from, for instance, a DVD used for cross-referencing with online movie databases. According to this second exemplary approach, the metadata may be at least a portion of said Information about said image. According to this second exemplary approach, information may be at least one of the image itself, a blurred image, a replacement image, and no image at all. According to this second exemplary approach, the reporting agent may at least one of part of the image monitoring system, part of the computing device, and external to the computing device. According to this second exemplary approach, the reporting agent may generate a report on the image. According to this second exemplary approach, the report may contain at least one of said score, metadata, image, blurred image, replacement image, and no image. According to this second exemplary approach, the reporting agent may collect, in a database, data on more than one image and consolidates said data into one report. According to this second exemplary approach, the report may display a list of recorded image access activity sorted by said score. According to this second exemplary approach, the report may display a list of recorded image access activity sorted chronologically. According to this second exemplary approach, the report may be available for viewing by a third party. According to this second exemplary approach, the viewing by a third party may be at least one of viewing from a remote computer using a Wide Area Network (WAN) such as the Internet, having said report sent by email, having said report sent by telecommunications methods such as telephone, having said report printed out on paper, and viewing directly on said computing device. According to this second exemplary approach, the report may have a plurality of parts which may contain other information, and may provide a link to other parts. According to this second exemplary approach, the images captured may include capturing images from at least one of: the data of the screen (the database that drives the image on the screen); the data of image files stored in the memory of said computing device; the data sent from a device capable of sending images; the data from an HDMI processor; the data sent from a device capable of sending videos; the data sent from a device capable of sending analog images; the data sent from a device capable of sending n-dimensional images (where n is a number greater than 2); data sent via a WAN such as the Internet; data sent via a LAN such as an Intranet; data from a camera; data from another computing device; data from a remote server; data from a Virtual Private Network; and data from a scanner. According to this second exemplary approach, image monitoring software may be part of an Internet monitoring system such as one system under the tradename COVENANT EYES. According to this second exemplary approach, the blocking may include at least one of: preventing any image from being viewed; blurring the image with the intention of obscuring details; replacing the image with another image; displaying no image at all. According to this second exemplary approach, other actions besides said blocking may be taken when an image is blocked, said other actions may include at least one of auditory alerts emitted from said computing device, and visual alerts displayed on said computing device. According to this second exemplary approach, the computing device may have the capability to turn off or on at least one other electronic device, and in which said electronic device is turned off or on when said blocking occurs. According to this second exemplary approach, the computing device may be a server or cluster of servers. According to this second exemplary approach, the MLIC and the software may periodically be updated with new known images or videos. According to this second exemplary approach, more than one spectrum and more than one score of said spectra of clean vs. non-clean may be individually, by at least one of a serial determination and parallel determination, processed by said image monitoring software. According to this second exemplary approach, the processed may include using the resulting analysis of each of said spectra, and said analysis weighted to provide said score, with said score being a summary of said weighted spectra. According to this second exemplary approach, the images captured by said image monitoring software may include the capturing of images from a queue of multiple images, such that the image monitoring software processes more than one image at a time, by at least one of a serial determination and parallel determination. According to this second exemplary approach, the blocking of said images may include replacing blocked images by at least one other image from the group of images being processed. According to this second exemplary approach, the multiple images may be captured from multiple sources including from at least one of: the data of the screen (the database that drives the image on the screen); the data of image files stored in the memory of said computing device; the data sent from a device capable of sending images; the data from an HDMI processor; the data sent from a device capable of sending videos; the data sent from a device capable of sending analog images; the data sent from a device capable of sending n-dimensional images (where n is a number greater than 2); data sent via a WAN such as the Internet; data sent via a LAN such as an Intranet; data from a camera; data from another computing device; data from a remote server; data from a Virtual Private Network; and data from a scanner. According to this second exemplary approach, the MLIC may be a Convolutional Neural Network (CNN).

According to a third exemplary approach, systems and methods for monitoring use of a selected user, may have a computing device having an image monitoring software installed thereon; wherein said computing device is capable of displaying images on a screen; wherein said image monitoring software includes a Machine Learning Image Classification Algorithm (MLIC); wherein said MLIC is configured to determine, by means of a score for images, proximity to either extreme of a spectrum ranging from clean to non-clean; wherein said images are of seismic data used for oil and gas exploration; wherein non-clean represents a location of dry holes, and said clean represents location of hydrocarbon-productive wells; wherein images captured by said image monitoring software are scored based on their relative position on said spectrum; wherein said score having a specified proximity to one of said extremes results in specific actions that include at least one of: information about said image being sent to a reporting agent; and blocking said image.

According to this third exemplary approach, seismic data may include individual traces, processed traces, collections of traces, or collections of processed traces, wherein said traces are measurements of sound waves travelling through the earth, generated by wave-generating input device (e.g. vibroseis, dynamite, sparker surveys, a sledge hammer, and the like) and recorded by a recording device (e.g. a geophone). According to this third exemplary approach, the score may be scaled from 0 to 100, with 0 being dry holes and 100 being hydrocarbon-productive wells, or 0 being hydrocarbon-productive wells and 100 being dry holes. According to this third exemplary approach, the reporting agent may cause a report to be displayed. According to this third exemplary approach, the specific actions may be sent to a remote device which is able to perform further actions. According to this third exemplary approach, the remote device may be another computing device. According to this third exemplary approach, the specific action may be to send a report to said remote device. According to this third exemplary approach, a user of said remote device may perform the action of blocking Internet access on said computing device. According to this third exemplary approach, a user of the remote device may perform the action of turning off said computing device. According to this third exemplary approach, the specific actions may be taken before said images or videos are displayed by said computing device. According to this third exemplary approach, the image monitoring software may be installed by the user. According to this third exemplary approach, the image monitoring software may come pre-installed on the device. According to this third exemplary approach, the image monitoring software may come pre-installed on the device and include an option for a user toggling the activity of the image monitoring software between "off" and "on." According to this third exemplary approach, the computing device may be a cluster of devices including at least one of individual computers, remote servers, other devices capable of communicating interactively with said computing device, and mobile devices. According to this third exemplary approach, the image monitoring software may be installed on said remote server. According to this third exemplary approach, the score may be at least one of a relative, numerical, alphabetical, and/or symbolic score. According to this third exemplary approach, the images may be at least one of still pictures, videos, streaming videos, 3-D images, holographic, virtual reality, and analog images. According to this third exemplary approach, the videos may be analyzed by capturing sequential images of the videos at predetermined time intervals and said scored includes an adjustment to said score based on images or portions of videos immediately in time preceding said displayed images. According to this third exemplary approach, the videos may be analyzed by capturing sequential images of the videos at predetermined time intervals and said scored includes an adjustment to said score based on images or portions of videos immediately in time leading (that is, to be displayed in the immediate future) displayed images. According to this third exemplary approach, analog data may be converted to digital by means of Mathematical transforms (such as Fourier and LaPlace), and then completed by said MLIC. According to this third exemplary approach, the image monitoring software may also capture metadata about the image. According to this third exemplary approach, the metadata may be used by the MLIC to help determine said score. According to this third exemplary approach, the metadata may include at least one of filename, timestamp, title, description, tags, source code, and hash from, for instance, a DVD used for cross-referencing with online movie databases. According to this third exemplary approach, the metadata may be at least a portion of said Information about said image. According to this third exemplary approach, the information may be at least one of the image itself, a blurred image, a replacement image, and no image at all. According to this third exemplary approach, the reporting agent may be at least one of part of the image monitoring system, part of the computing device, and external to the computing device. According to this third exemplary approach, the reporting agent may generate a report on the image. According to this third exemplary approach, the report may contain at least one of said score, metadata, image, blurred image, replacement image, and no image. According to this third exemplary approach, the reporting agent may collect, in a database, data on more than one image and consolidates said data into one report. According to this third exemplary approach, the report may display a list of recorded image access activity sorted by said score. According to this third exemplary approach, the report displays a list of recorded image access activity sorted chronologically. According to this third exemplary approach, the report may be available for viewing by a third party. According to this third exemplary approach, the viewing by a third party may be at least one of viewing from a remote computer using a Wide Area Network (WAN) such as the Internet, having said report sent by email, having said report sent by telecommunications methods such as telephone, having said report printed out on paper, and viewing directly on said computing device. According to this third exemplary approach, the report may have a plurality of parts which may contain other information, and may provide a link to other parts. According to this third exemplary approach, the images captured may include capturing images from at least one of: the data of the screen (the database that drives the image on the screen); the data of image files stored in the memory of said computing device; the data sent from a device capable of sending images; the data from an HDMI processor; the data sent from a device capable of sending videos; the data sent from a device capable of sending analog images; the data sent from a device capable of sending n-dimensional images (where n is a number greater than 2); data sent via a WAN such as the Internet; data sent via a LAN such as an Intranet; data from a camera; data from another computing device; data from a remote server; data from a Virtual Private Network; and data from a scanner. According to this third exemplary approach, the image monitoring software may be part of an Internet monitoring system such as system operating under the tradename COVENANT EYES. According to this third exemplary approach, the blocking may include at least one of: preventing any image from being viewed; blurring the image with the intention of obscuring details; replacing the image with another image; displaying no image at all. According to this third exemplary approach, other actions besides said blocking may be taken when an image is blocked, said other actions to include at least one of auditory alerts emitted from said computing device, and visual alerts displayed on computing device. According to this third exemplary approach, the computing device may have the capability to turn off or on at least one other electronic device, and in which said electronic device is turned off or on when said blocking occurs. According to this third exemplary approach, the computing device may be a server or cluster of servers. According to this third exemplary approach, the MLIC and said software may be periodically updated with new known images or videos. According to this third exemplary approach, more than one spectrum and more than one score of said spectra of clean vs. non-clean may be individually, by at least one of a serial determination and parallel determination, processed by said image monitoring software. According to this third exemplary approach, the process may include using the resulting analysis of each of said spectra, and said analysis weighted to provide said score, with said score being a summary of said weighted spectra. According to this third exemplary approach, the images captured by said image monitoring software may include the capturing of images from a queue of multiple images, such that the image monitoring software processes more than one image at a time, by at least one of a serial determination and parallel determination. According to this third exemplary approach, the blocking said images may include replacing blocked images by at least one other image from the group of images being processed. According to this third exemplary approach, the multiple images may be captured from multiple sources including from at least one of: the data of the screen (the database that drives the image on the screen); the data of image files stored in the memory of said computing device; the data sent from a device capable of sending images; the data from an HDMI processor; the data sent from a device capable of sending videos; the data sent from a device capable of sending analog images; the data sent from a device capable of sending n-dimensional images (where n is a number greater than 2); data sent via a WAN such as the Internet; data sent via a LAN such as an Intranet; data from a camera; data from another computing device; data from a remote server; data from a Virtual Private Network; and data from a scanner. According to this third exemplary approach, the MLIC may a Convolutional Neural Network (CNN).

According to a fourth exemplary approach, systems and methods for monitoring use of a computing device by a selected user, may have the computing device capable of displaying images on a screen and having a system installed thereon to monitor said displayed images; the image monitoring system having a Machine Learning Image Classification Algorithm (MLIC) configured to assign a score for the monitored image within a predetermined range, the predetermined range ranging between clean and non-clean; the MLIC further configured to output a command to the system based on the assigned score; and wherein when the assigned score outputs a command, the outputted command is selected from the group consisting of at least one of: outputting a report to a reporting agent, blocking the displayed image from the screen, and removing the image from the computing device.

According to a fifth exemplary approach, systems and methods to monitor use of a computing device of a selected user, may have installing an image monitoring software on the computing device; displaying images on a screen of the computing device; monitoring said image using a Machine Learning Image Classification Algorithm (MLIC)); configuring the MLIC to determine, by means of a score for images, proximity to either extreme of a spectrum ranging from clean to non-clean; scoring images captured by said image monitoring software based on their relative position on said spectrum; and commanding the computing device based on said score having a specified proximity to one of said extremes results in specific actions that include at least one command of: sending information about said image to a reporting agent; and blocking said image.

According to a sixth exemplary approach, systems and methods are provided for monitoring use of a selected user, that may have a computing device having an image monitoring software installed thereon; and wherein said computing device is capable of displaying images on a screen; wherein said computing device includes a medical imaging system including at least one of x-ray, positron emission tomography, ultrasound, and magnetic resonance and the like; wherein said image monitoring software includes a Machine Learning Image Classification Algorithm (MLIC); wherein said MLIC is configured to determine, by means of a score for images, proximity to either extreme of a spectrum ranging from clean to non-clean; wherein said one extreme of said spectrum represents the presence of a specified medical condition, said medical condition to include at least one of cancer, broken bones, organ disease, infection brain disorders, dementia, multiple sclerosis, and organ disorders; wherein said other extreme of said spectrum represents the absence of said medical condition; wherein images captured by said image monitoring software are scored based on their relative position on said spectrum; wherein said score having a specified proximity to one of said extremes results in specific actions that include at least one of: information about said image being sent to a reporting agent; and blocking said image.

According to this sixth exemplary approach, the score may be scaled from 0 to 100, with 0 being the presence of said medical condition and 100 being the absence of said medical condition, or 0 being the absence of said medical condition and 100 being the presence of said medical condition. According to this sixth exemplary approach, the reporting agent may cause a report to be displayed. According to this sixth exemplary approach, the specific actions may be sent to a remote device which is able to perform further actions. According to this sixth exemplary approach, the remote device may be another computing device. According to this sixth exemplary approach, the specific action may be to send a report to said remote device. According to this sixth exemplary approach, a user of said remote device may perform the action of turning off said computing device. According to this sixth exemplary approach, the specific actions may be taken before said images or videos are displayed by said computing device. According to this sixth exemplary approach, the image monitoring software may be installed by the user. According to this sixth exemplary approach, the image monitoring software may come pre-installed on the device. According to this sixth exemplary approach, the image monitoring software may come pre-installed on the device and may include an option for a user toggling the activity of the image monitoring software between "off" and "on." According to this sixth exemplary approach, the computing device may be a cluster of devices including at least one of individual computers, remote servers, other devices capable of communicating interactively with said computing device, and mobile devices. According to this sixth exemplary approach, the image monitoring software may be installed on said remote server. According to this sixth exemplary approach, the score may be at least one of a relative, numerical, alphabetical, and/or symbolic score. According to this sixth exemplary approach, the images may be at least one of still pictures, videos, streaming videos, 3-D images, holographic, virtual reality, and analog images. According to this sixth exemplary approach, the videos may be analyzed by capturing sequential images of the videos at predetermined time intervals and said scored may include an adjustment to said score based on images or portions of videos immediately in time preceding said displayed images. According to this sixth exemplary approach, the videos may be analyzed by capturing sequential images of the videos at predetermined time intervals and said scored may include an adjustment to said score based on images or portions of videos immediately in time leading (that is, to be displayed in the immediate future) displayed images. According to this sixth exemplary approach, analog data may be converted to digital by means of mathematical transforms (such as Fourier and LaPlace), and then completed by said MLIC. According to this sixth exemplary approach, the image monitoring software may also capture metadata about the image. According to this sixth exemplary approach, the metadata may be used by the MLIC to help determine said score. According to this sixth exemplary approach, the metadata may include at least one of filename, timestamp, title, description, tags, source code, and user input. According to this sixth exemplary approach, the metadata may be at least a portion of said Information about said image. According to this sixth exemplary approach, the information may be at least one of the image itself, a blurred image, a replacement image, and no image at all. According to this sixth exemplary approach, the reporting agent may be at least one of part of the image monitoring system, part of the computing device, and external to the computing device. According to this sixth exemplary approach, the reporting agent may generate a report on the image. According to this sixth exemplary approach, the report may contain at least one of said score, metadata, image, blurred image, replacement image, and no image. According to this sixth exemplary approach, the reporting agent may collect, in a database, data on more than one image and consolidates said data into one report. According to this sixth exemplary approach, the report may display a list of recorded image access activity sorted by said score. According to this sixth exemplary approach, the report may display a list of recorded image access activity sorted chronologically. According to this sixth exemplary approach, the report may be available for viewing by a third party. According to this sixth exemplary approach, the viewing by a third party may be at least one of viewing from a remote computer using a Wide Area Network (WAN) such as the Internet, having said report sent by email, having said report sent by telecommunications methods such as telephone, having said report printed out on paper, and viewing directly on said computing device. According to this sixth exemplary approach, the report may have a plurality of parts which may contain other information, and may provide a link to other parts. According to this sixth exemplary approach, the images captured may include capturing images from at least one of: the data of the screen (the database that drives the image on the screen); the data of image files stored in the memory of said computing device; the data sent from a device capable of sending images; the data from an HDMI processor; the data sent from a device capable of sending videos; the data sent from a device capable of sending analog images; the data sent from a device capable of sending n-dimensional images (where n is a number greater than 2); data sent via a WAN such as the Internet; data sent via a LAN such as an Intranet; data from a camera; data from another computing device; data from a remote server; data from a Virtual Private Network; and data from a scanner. According to this sixth exemplary approach, the blocking may include at least one of: preventing any image from being viewed; blurring the image with the intention of obscuring details; replacing the image with another image; displaying no image at all. According to this sixth exemplary approach, other actions besides said blocking may be taken when an image is blocked, said other actions may include at least one of auditory alerts emitted from said computing device, and visual alerts displayed on said computing device. According to this sixth exemplary approach, the computing device may have the capability to turn off or on at least one other electronic device, and in which said electronic device may be turned off or on when said blocking occurs. According to this sixth exemplary approach, the computing device may be a server or cluster of servers. According to this sixth exemplary approach, the MLIC and said software may periodically be updated with new known images or videos. According to this sixth exemplary approach, more than one spectrum and more than one score of said spectra of clean vs. non-clean may individually, by at least one of a serial determination and parallel determination, be processed by said image monitoring software. According to this sixth exemplary approach, the process may include using the resulting analysis of each of said spectra, and said analysis may be weighted to provide said score, with said score being a summary of said weighted spectra. According to this sixth exemplary approach, the images captured by said image monitoring software may include the capturing of images from a queue of multiple images, such that the image monitoring software processes more than one image at a time, by at least one of a serial determination and parallel determination. According to this sixth exemplary approach, the blocking said images may include replacing blocked images by at least one other image from the group of images being processed. According to this sixth exemplary approach, multiple images may be captured from multiple sources including from at least one of: the data of the screen (the database that drives the image on the screen); the data of image files stored in the memory of said computing device; the data sent from a device capable of sending images; the data from an HDMI processor; the data sent from a device capable of sending videos; the data sent from a device capable of sending analog images; the data sent from a device capable of sending n-dimensional images (where n is a number greater than 2); data sent via a WAN such as the Internet; data sent via a LAN such as an Intranet; data from a camera; data from another computing device; data from a remote server; data from a Virtual Private Network; and data from a scanner. According to this sixth exemplary approach, the MLIC may be a Convolutional Neural Network (CNN).

According to a seventh exemplary approach, systems and methods for monitoring use of a computing device by a selected user, may include a control circuit coupled to memory storing at least image monitoring software that when executed by the control circuit causes the control circuit to; display images on a screen; implement a Convolutional Neural Network (CNN) Machine Learning Image Classification Algorithm (MLIC), wherein said CNN (MLIC) is configured to determine, by means of a score for images, proximity to either extreme of a spectrum ranging from clean to non-clean; and score images captured by said image monitoring software, through the application of the CNN (MLIC), based on a determined relative position on the spectrum; wherein each of said scores having a specified proximity to one of said extremes results in specific actions that include at least one of: information about said image being sent to a reporting agent; and blocking said image.

In an eighth exemplary approach, blocking, modifying or obscuring may include alpha blending of images, wherein an image is "overlain" over an underlying image with a level of translucency ranging from completely transparent to completely opaque. These technologies may serve in some applications as a filter.

There also exists technology that uses a process called alpha blending to modify or obscure, or even block, images. These technologies may serve in some applications as a filter. The deficit of those technologies is that they do not reverse the alpha blending process to recover the image of interest so that it can be analyzed for the next, or a later, incoming image.

FIG. 1 is a schematic of an exemplary embodiment of a system 50 including a Computing Device 52 and incorporating an Intelligent Computer Vision System generally indicated at 54. In this example, the computing device 52 can include one or more image processors and/or has installed, either by the user voluntarily, or pre-installed on the computing device, an Image Processor 64. In the embodiment illustrated in FIG. 1, the Computing Device 52 includes an Image Input Device 56 and/or Image Output Device 70, which may be internal to the Computing Device 52, or may be external to the Computing Device 52 (for instance, the Image Output Device 70 may be a television separate from the Computing Device 52). As shown in FIG. 1, the Computing Device 52 includes a Reporting Agent 68. The Reporting Agent 68 may be installed on the Computing Device 52, or may be incorporated into the Image Processor 64, or may be external to the Computing Device 52. The Computing Device 52 may, in some embodiments, be a cluster of servers, computers, or other devices capable of collectively having the Image Processor 64 installed thereon.

Since many media technologies exist, multiple technology-specific Image Processors 64 (which may be implemented via a loop 60) can coexist to properly process all incoming media types. For example, one Image Processor 64 may process network traffic between a computer and its client applications (e.g. a web browser), while another Image Processor 64 may process video frames from a DVD player application.

Figure 3:
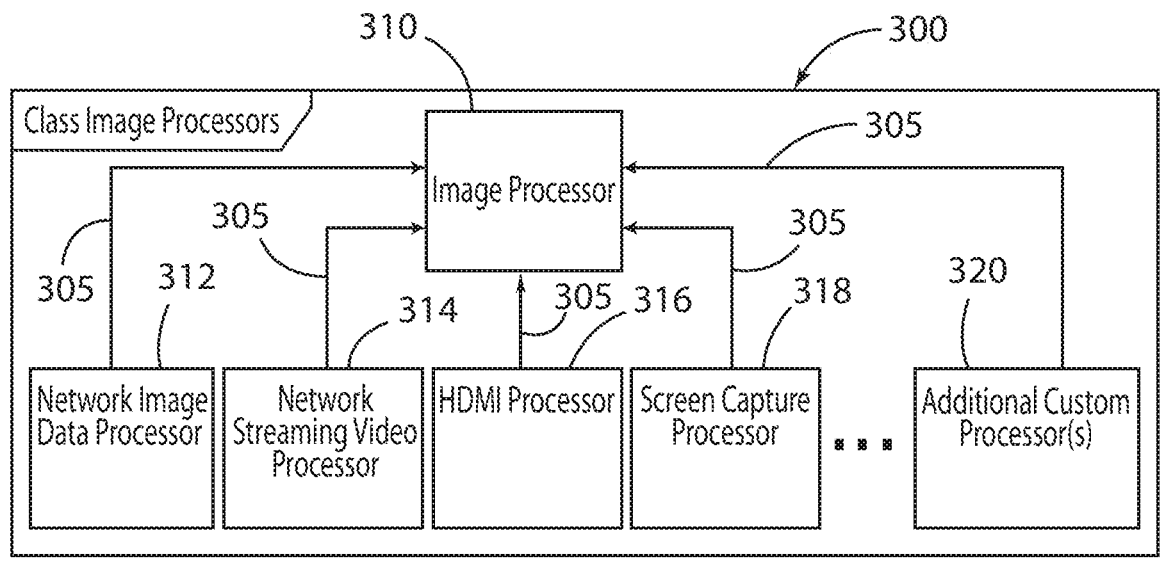
FIG. 3 is a schematic of an exemplary embodiment of an image processor with examples of a variety of image source devices, protocols, and methods.

The exemplary system 50 depicted in FIG. 1 can be initiated with image inputs 56 derived from the user's media stream, which may include, but are not limited to: Camera/digital image capture device; Network traffic—Video stream; Network traffic—Still images; Computer Display—Screen capture; Video Cable—HDMI; Video Cable—Component Video; and the like. Some examples of the interaction between the Image Processor and the image inputs are shown in FIG. 3. With reference back to FIG. 1, the Image Processor 64 which may include image processors custom for each media technology, receives the image output 56 at 58 and provides end-to-end processing for the captured images. In some implementations, the image processing by the Image Processor 64 includes but is not limited to: (1) image classification via, for example, a multiple local area network (LAN) internet protocol converter (MLIC) algorithm, (2) non-clean image obscuring or blocking, (3) image metadata reporting, and (4) potential image forwarding to the user's media output stream.

In some embodiments, the exemplary Image Classifier 66 shown in FIG. 1 analyzes input images using an MLIC algorithm, such as a convolutional neural network (CNN) model. In some aspects, the system implementer may train the MLIC algorithm to distinguish input images among the classes of interest (e.g. clean and non-clean). In some embodiments, an ensemble of MLIC algorithms (see glossary) may be used to improve performance, wherein the majority vote of a collection of independent MLIC algorithms determines the system's classification (e.g. either "clean" or "non-clean") of an input image. In other embodiments, a known Region Proposal Algorithm (see glossary) may be used to improve classification performance by proposing sub-regions of an input image for classification. In this case, the MLIC algorithm independently classifies each proposed image sub-region as clean or not-clean, and, in one exemplary embodiment, the system's classification of the full input image is considered clean if and only if the MLIC algorithm classified all image sub-regions as clean.

With reference back to FIG. 1, the Reporting Agent 68 collects data via 61 and transmits image metadata using known network protocols to a backend system (e.g., those under the tradename APACHE server and MYSQL database) dedicated to tracking user viewing habits. In some embodiments, using established best practice reporting methods, scheduled user reports offer concise summaries of the users' viewing history and habits, allowing media-use accountability among users. Image Processor 64 forwards, via 62, clean or modified images to the user's viewable output stream 70. It will be appreciated that the Image Output 70 process differs by type of Image Processor 64 implemented in the system 50.

Figure 2:
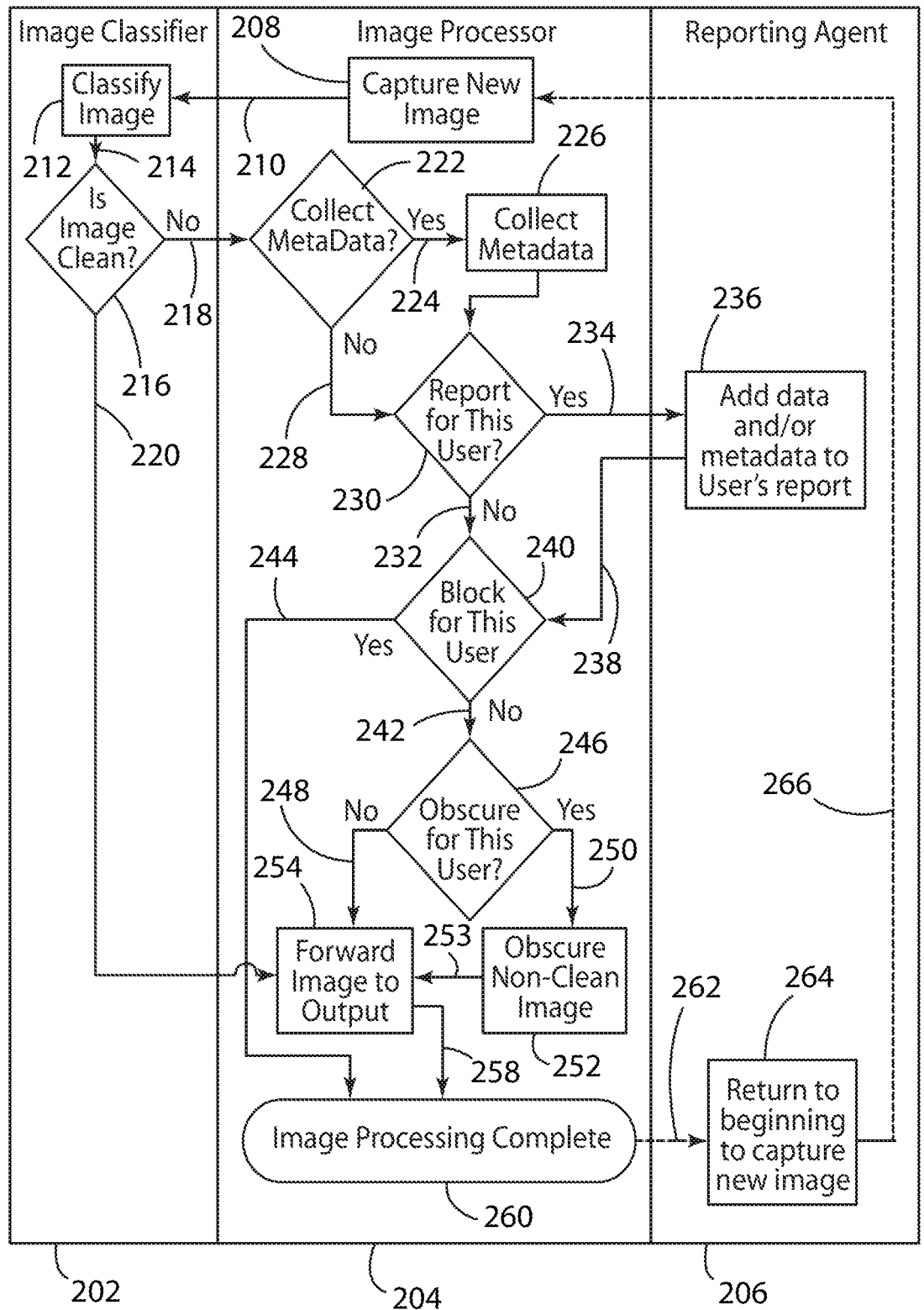
FIG. 2 is an exemplary schematic of a processing flow of a method of monitoring and reporting according to one of the present embodiments showing activities of an image processor and its relation to the image classifier and the reporting agent.

FIG. 2 illustrates an exemplary processing flow generally indicated at 200 of the methods and systems according to some embodiments. Specifically, FIG. 2 is a diagram showing a schematic of an exemplary processing flow of the present Intelligent Computer Vision System 54, installed on the Computing Device 52 of FIG. 1. Three components of the system are delineated by the vertical columns of FIG. 2. The middle column 204 shows the Image Processor (labelled 64 in FIG. 1) and its functions; the left column 202 shows the Image Classifier (labelled 66 in FIG. 1) and its functions; and the right column 206 shows the Reporting Agent (labelled 68 in FIG. 1) and its functions.

With reference to FIG. 2, the Image Processor 204 captures a new image. The system 50 recognizes and processes image data from one or multiple sources as previously described with reference to FIG. 1. This Capture process 208 depends on the implementation of the Image Processor 204 for each Image source type. In some aspects, each Image Processor 204 handles one source at a time. Notably, the Screen Capture Image Processor 318 of FIG. 3 may handle multiple input sources, one input source per top-level window that appears on the screen.

With reference back to FIG. 2, the process advances at step 210 to image classifier 202 in order to classify the image at 212 by way of step 214 to determine at step 216 whether the image is scored as clean or non-clean (or however the predetermined threshold classification is set). In some aspects, the Image Classifier 202 analyzes input images using a known MLIC algorithm, such as a convolutional neural network (CNN) model. In some approaches, the system implementer trains the MLIC algorithm to distinguish input images among the classes of interest (e.g. clean and non-clean). In some embodiments, an ensemble of MLIC algorithms (see glossary) is used to improve performance, wherein the majority vote of a collection of independent MLIC algorithms determines the system's classification (e.g. either "clean" or "non-clean") of an input image. In other embodiments, a known Region Proposal Algorithm (see glossary) may be used to improve classification performance by proposing sub-regions of an input image for classification. In this case, the MLIC algorithm independently classifies each proposed image sub-region as clean or not-clean, and, in one exemplary embodiment, the system's classification of the full input image is considered clean if and only if the MLIC algorithm classified all image sub-regions as clean. With reference to FIG. 2, in some aspects, the Image Classifier 202 executes a known MLIC algorithm (e.g. a CNN model) to determine whether or not an input image is clean at 216, as described in the glossary herein.

If the image is determined by the Image Classifier 202 to be clean at step 216, the Image Classifier 202, via 220, forwards the image to the Image Processor 204 for output 254, after which the image is advanced via output 258 to complete the image processing 260, after which the process 200 proceeds via output 262 of the Reporting Agent 206 to return back to the beginning at 264 to capture a new image 208 via output 266.

If the image is determined by the Image Classifier 202 to not be clean at step 216, the system via output 218 determines whether to collect metadata at 222. In some embodiments, as described herein, it is desirable to collect metadata about the image, such as the source of the image, titles, the device on which it is to be displayed, filename, description, tags, a hash for cross-referencing DVD content with online movie databases, and the like. If such metadata is requested by the system at 224, it is collected at step 226, then advances to step 230. If such data is not requested by the system at 228, the system just advances to step 230.

With reference to FIG. 2, at 230, a determination is made by the Image Processor 204 as to whether to generate a report for this user. If yes, pertinent image metadata can be collected via output 234 and used at 236 to determine, in part, data that could be reported for this user which then proceeds from the Reporting Agent 206 via output 238 to a determination 240 of whether to block the image for this user. If no report is determined by the Image Processor 204 at 230, the output 232 advances to step 240.

In some embodiments, users may choose to receive scheduled, automated reports on their media viewing history and habits. The Image Processor 204, at step 230, determines if such a report is requested, and if it is requested, passes data on to Reporting Agent. For users to receive reports, non-clean image metadata is stored in a database for report generation. Optionally included metadata may include factors determining that the image was non-clean, other metadata collected at 226, and may also include the image itself or a partially obscured image, or a replacement image. In some embodiments, the report is sent to the intended report recipient without being stored in a database; in other embodiments, the report is first stored and the sent to the user; in some embodiments, said report may include other data or metadata not related to the analyzed image.

With reference to FIG. 2, next, at step 240, the Image Processor 204 determines whether to block the image. If yes, the system advances to step 260 via output 244. In some embodiments, the Image Processor 204 is configured to block non-clean images, including the potential blocking of entire media sources found to produce non-clean images. The specific blocking pipeline depends on the input media source along with the specific image display technology. For example, a non-clean image for a web browser may be replaced by a stock photo with the same dimensions, a non-clean video stream for a web browser may be truncated, and a photo viewing application displaying non-clean images may be fully terminated.

If at step 240, a decision not to block the image is determined by the Image Processor 204, then, via output 242, the process flow advances to a determination 246 of whether to obscure the image. In some embodiments, the system is configured to obscure, rather than block, non-clean images. This option allows users higher visibility into their media flow while still suppressing non-clean content. If a determination not to obscure the image is made at step 246, then, via output 248, the image is forwarded to image output 254. If a yes determination is made at step 246, then the non-clean image proceeds via 250 and is obscured at step 252, then proceeds via output 253 to step 254, after which the image is forwarded via 258 for output. Clean and obscured, replaced or blank non-clean images are forwarded to the user-viewable output stream by means of the Image Output Device 254. Non-clean images may be algorithmically altered to the point that medium to high level details are no longer discernible. As shown in the exemplary embodiment depicted in FIG. 2, the monitor and/or filter process 200 completes processing of a single image at which time it returns to capture a new image via output 266.

FIG. 3 shows a schematic of relationships between the Image Processor 310 and a variety of exemplary video or image data stream technologies and is generally shown at 300. As discussed above, the Image Processor 64 of FIG. 1 and the Image Processor 204 of FIG. 2 may include and encapsulate multiple Image Processor units, where each Image Processor instance supports a specific video or image data stream technology. With reference to FIG. 3, the diagram arrows 305 depict the generalization and/or specialization relationship characterized by the phrase "is a specialization of." For example, as indicated via the arrow 305 leading from the Screen Capture Processor 318 to the Image Processor 310, the Screen Capture Processor 318 "is a specialization of" Image Processor 310.

FIG. 3 shows an Image Processor 310 that can be a software method, system, and process installed on a system 50 including a computing device 52 (which may be a cluster of devices), which captures input images from a variety of Image Input Devices (see FIG. 1) and causes those images to be classified by an MLIC algorithm (e.g. CNN) executed by the Image Classifier 202 (FIG. 2), which determines if the image is clean or non-clean. With reference to FIG. 1, if the image is determined by the Image Processor 64 to be clean, the Image Processor 64 forwards the image to Output 70. With reference to FIG. 2, if the image is determined by the Image Processor 204 to be non-clean 216, the Image Processor 204 determines if metadata should be collected 222 (and if so, collects that data at 226); determines if the image should be reported via the Reporting Agent 230, and if so causes data and/or metadata to be forwarded to the Reporting Agent 236 and determines if the image should be blocked, obscured, or replaced by another image or no image 240, and if the image is to be obscured or replaced, the Image Processor 204 performs that action 252 and forwards the image to the Output Device 254. In some embodiments, the Image Processor 204 repeats the above-described process for every image, or for selected images (for instance, in a video stream, the stream may be sampled every half-second) received through the Image Input Device.

With reference back to FIG. 3, HDMI Processor 316 can be a specialization of Image Processor 310 responsible for intercepting images over an HDMI cable prior to their arrival at a monitor display or other component video device (e.g. DVR). HDMI decoding and encoding requires specialized hardware and software (See https://en.wikipedia.org/wiki/HDMI). While the system 50 is described in connection with various embodiment as processing video input streams for purposes of image collection, in some aspects, the system 50 may use other HDMI data signals to provide metadata used for reporting and scoring. This includes the CEC to retrieve the name of the device for reporting, image resolution for reporting, close captioning via MPEG-2 video stream for reporting and weighted analysis as described herein.

Network Image Data Processor 312 can be a specialization 305 of Image Processor 310 responsible for intercepting images over a network prior to their arrival at a network client application (e.g. a web browser). The Network Image Data Processor 312 uses known in the art techniques for network interception and browser interception using network VPN, proxy, man-in-the-middle tactics and/or web browser extensions. By intercepting the image en route, the blocked Image can be modified before the application receives it. This gives the Network Image Data Processor 312 additional capability to blur images or replace images in the process of blocking. In the case of an image retrieved over a network, metadata related to the link (e.g. URL) associated with the image can be collected. Image metadata such as title and tags may be present in the HTML surrounding the link to the image. This information can be collected by parsing the HTML using known in the art HTML parsers or using the API exposed by the web browser to a browser extension.

Network Streaming Video Processor 314 can be a specialization 305 of Image Processor 310 responsible for intercepting video frames over a network prior to their arrival at a network client application (e.g. a web browser embedded video player). The Network Streaming Video Processor 314 uses known in the art techniques for network interception and browser interception using network VPN, proxy, man-in-the-middle tactics and/or web browser extensions. By intercepting the video stream en route, the blocked Image can be modified before the application receives it. This gives the Network Streaming Video Processor 314 additional capability to blur images or replace images in the process of blocking. In the case of an Image retrieved over a network, metadata related to the link (e.g. URL) associated with the image can be collected. Image metadata such as title and tags may be present in the HTML surrounding the link to the image. Additional Image metadata may be available from the video player including streaming format, close captioning, and current location in the video. This information can be collected by parsing the HTML using known in the art HTML parsers, streaming video open source software such as ffmpeg, or using the API exposed by the web browser to a browser extension.

Screen Capture Processor 318 can be a specialization 305 of Image Processor 310 responsible for intercepting images displayed on a computer monitor. A single computer screen may display images from multiple applications simultaneously, requiring Screen Capture Processor 318 to examine each window separately. In some embodiments, screen capture is performed by sequentially calling high performance graphical API's provided by the operating system, such as the DirectX GetFrontBufferData( ) function on Windows operating systems. In a windowing system (https://en.wikipedia.org/wiki/Windowing_system), a single screen capture may display images from multiple applications simultaneously, where each application manages the content displayed in its top-level windows (see top-level in https://en.wikipedia.org/wiki/Root_window). In some embodiments, the Screen Capture Processor 318 identifies what top-level windows are visible using the operating system's graphical user interface API to determine 2-D Cartesian location, z-order (https://en.wikipedia.org/wiki/Z-order) of top-level windows, and visibility attributes. In one aspect, the Screen Capture Processor 318 classifies the content of each visible window as a separate Image, and will report and block images according to the application that displayed it. In virtual reality, augmented reality or other 3-dimensional environments, the concepts of Z-order and top-level windows may be replaced by avatars, widgets, or other objects rendered in 3-dimensional space. Screen Capture Image metadata can include information about the application that the was found in such as the executable filename, application title using process and GUI APIs such as GetModuleBaseName and GetWindowText in the Windows API.

In some embodiments, additional Custom Processors 320 referenced in FIG. 3 can include each video or image data stream technology and is a candidate for a custom Image Processor unit, so an intelligent computer vision filter and monitor system may encapsulate many additional Image Processors, depending on the media and technology environment in which the system operates.

Figure 4:
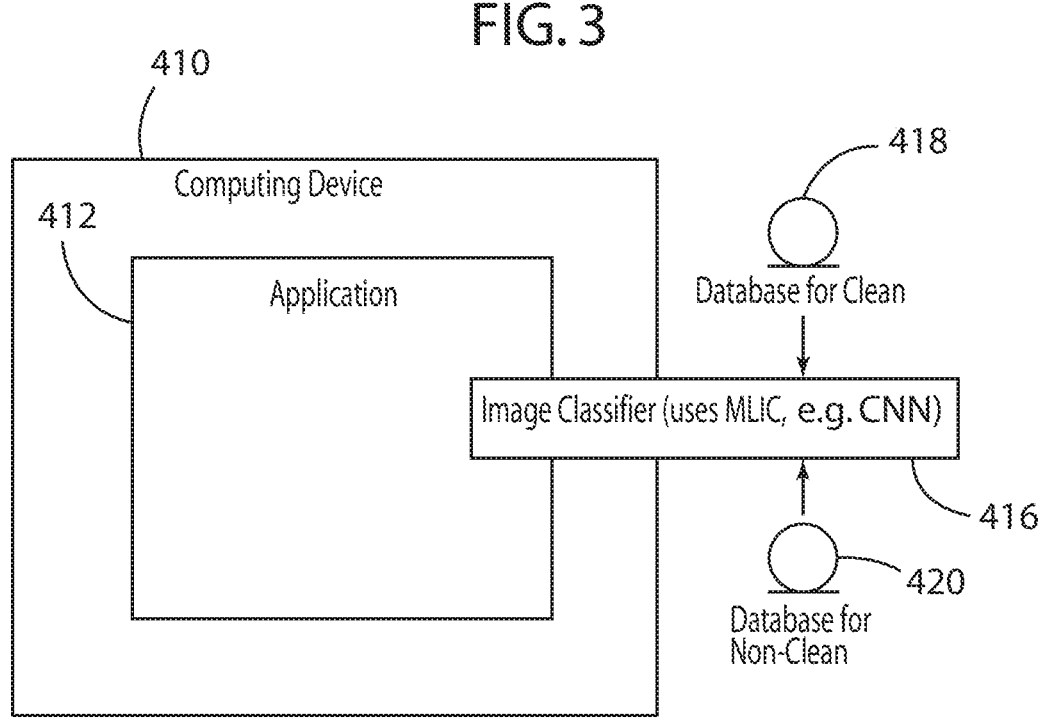
FIG. 4 is a schematic of an exemplary convolutional neural network using a convolutional neural network as an exemplary type of machine learning image classification algorithm (Abbreviated MLIC algorithm, as defined in glossary) according to the present embodiments.

FIG. 4 shows an exemplary schematic 400 of how the Image Classifier 416 (which executes a MLIC algorithm, such as a CNN model) is implemented to tie together the exemplary systems and methods described herein, the computing device 410 and the collection of sample training images. In some embodiments, the Image Classifier 416 is configured to execute a known MLIC algorithm that has been trained by the system implementer using human-reviewed, or otherwise acquired, sample images stored in electronic databases (e.g. hdf5 or lmdb) to distinguish between two or more image classes (e.g. clean 418 and non-clean 420). In some embodiments, the Image Classifier 416 resides on a provider's software 412 installed on the Computing Device 410, or may be implemented such that it is external to the Computing Device.

For the electronic database for images determined to be clean 418, a system implementer may collect, via known web-scraping, crowd-sourcing, or predetermination (such as, for example, purchase of a database from a third party) techniques a large collection of images (e.g. 1,000,000), which are then human-reviewed, or otherwise analyzed, to be in the class "clean" (with the remainder discarded). In some embodiments, images are stored in a known computer database storage format (e.g. hdf5 or lmdb) and are used to train the MLIC algorithm executed by the Image Classifier 416 for the image classification task (see paragraph 34). In some aspects, the system allows for online training (see glossary), wherein the Image Classifier 416 may be updated on the basis of new training images stored in the Database for Clean 418. In this case, a copy of the model is retrained with the additional training images, at which time the retrained model replaces the old model, so as not to interrupt system flow.

For the electronic the database for images determined to be non-clean 418, a system implementer may collect, via known web-scraping, crowd-sourcing, or predetermination (such as, for example, purchase of a database from a third party) techniques a large collection of images (e.g. 1,000,000), which are then human-reviewed (or other automated review techniques) to be in the class "non-clean" (with the remainder discarded). In some embodiments, images are stored in a known computer database storage format (e.g. hdf5 or lmdb) and are used to train the MLIC algorithm executed by the Image Classifier 416 for the image classification task. In some aspects, the system allows for online training (see glossary), wherein the Image Classifier 416 may be updated on the basis of new training images stored in the Database for Non-Clean 420. In this case, a copy of the model is retrained with the additional training images, at which time the retrained model replaces the old model, so as not to interrupt system flow.

With reference to FIG. 4, in some embodiments, an application 412 is a software-implemented system installed on the Computing Device 410 that provides the system and method of monitoring and/or filtering. In some aspects, the Computing Device 410 can have software installed that can either perform the functions of the application 412 or, if the Computing Device 410 is a cluster of devices, the application 412 may reside external to the Computing Device 410 (see FIG. 5).

In general, the present embodiments can be realized as methods or systems in hardware, software, or a combination of hardware and software of a computing device system including a computing device network system. The present embodiments can be realized in a centralized fashion in one computing device system or in a distributed fashion where different elements are spread across several computing device systems. Any kind of computer system, or other apparatus adapted for carrying out the methods described herein, is suited. A typical combination of hardware and software may include a general purpose computer system with a computer program that, when being loaded and executed, controls the computer system such that it carries out the systems and methods described herein. The present embodiments may be voluntarily embedded in a computing device program product (or any computing device useable medium having computer readable program code embodied therein), which comprises all the features enabling the implementation of the methods and systems described herein and which when loaded in a computing device system is able to carry out these systems and methods.

The methods and systems according to the present embodiments may be embedded in a computing device program product by a manufacturer or vendor of the computing device (or any computing device useable medium having computer readable program code embodied therein), which comprises all the features enabling the implementation of the methods and systems described herein and which when loaded in a computer system is able to carry out these systems and methods, and is voluntarily turned off or on by the user. The methods and systems according to the present embodiments may be embedded in a computer program product by a manufacturer or vendor of the computer (or any computer useable medium having computer readable program code embodied therein), which comprises all the features enabling the implementation of the methods and systems described herein and which when loaded in a computer system carries out these systems and methods and cannot be turned off by the user.

Figure 5:
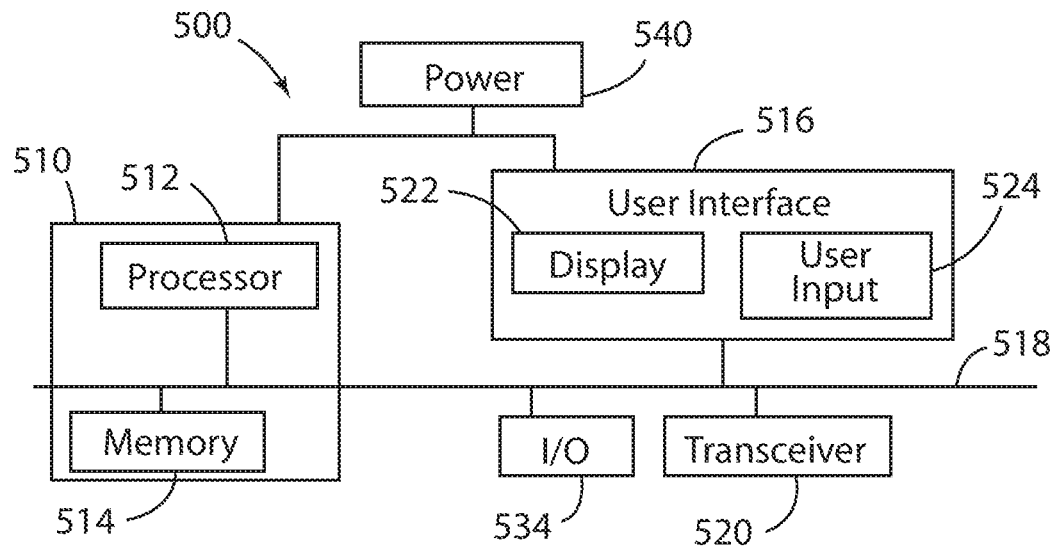
FIG. 5 illustrates an exemplary system for monitoring external data requests of a computing device, in accordance with some of the present embodiments.

Further, the processes, methods, techniques, circuitry, systems, devices, functionality, services, servers, sources and the like described herein may be utilized, implemented and/or run on many different types of devices and/or systems. Referring to FIG. 5, there is illustrated an exemplary system 500 that may be used for many such implementations, in accordance with some embodiments. One or more components of the system 500 may be used for implementing any circuitry, system, functionality, apparatus or device mentioned above or below, or parts of such circuitry, functionality, systems, apparatuses or devices, such as for example any of the above or below mentioned computing device, the systems and methods of the present embodiments, request processing functionality, monitoring functionality, blocking functionality, analysis functionality, additionally evaluation functionality and/or other such circuitry, functionality and/or devices. However, the use of the system 500 or any portion thereof is optional and is not required.

In some embodiments, the exemplary system 500 may comprise a controller 510 and/or processor module 512, memory 514, and one or more communication links, paths, buses or the like 518. In some embodiments, the system 500 includes a user interface 516 and/or a power source or supply 540. The controller 510 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, programs, content, listings, services, interfaces, logging, reporting, etc. Further, in some embodiments, the processor module 512 can be part of control circuitry and/or a control system 510, which may be implemented through one or more processors with access to one or more memory 514. In some aspects, the user interface 516 allows a user to interact with the system 500 and receive information through the system. In some embodiments, the user interface 516 includes a display 522 and/or one or more user inputs 524, such as a buttons, touch screen, track ball, keyboard, mouse, etc., which can be part of or wired or wirelessly coupled with the system 500.

In the exemplary embodiment shown in FIG. 5, the system 500 further includes one or more communication interfaces, ports, transceivers 520, and the like allowing the system 500 to communication over a communication bus, a distributed network, a local network, the Internet, communication link 518, other networks or communication channels with other devices and/or other such communications or combinations thereof. Further, in some aspects, the transceiver 520 is configured for wired, wireless, optical, fiber optical cable or other such communication configurations or combinations of such communications. Some embodiments include one or more input/output (I/O) ports 534 that allow one or more devices to couple with the system 500. The I/O ports can be substantially any relevant port or combinations of ports, such as but not limited to USB, Ethernet, or other such ports.

The system 500 comprises an example of a control and/or processor-based system with the controller module 510. Again, the controller module 510 can be implemented through one or more processors, controllers, central processing units, logic, software and the like. Further, in some implementations the controller module 510 may provide multiprocessor functionality by including multiple processors 512.

In some embodiments, the memory 514, which can be accessed by the processor 512 of the controller module 510, includes one or more processor readable and/or computer readable media accessed by at least the controller 510, and can include volatile and/or nonvolatile media, such as RAM, ROM, EEPROM, flash memory and/or other memory technology. Further, the memory 514 is shown as internal to the controller module 510; however, the memory 514 can be internal, external or a combination of internal and external memory. Similarly, some or all of the memory 514 can be internal, external or a combination of internal and external memory of the controller module 510. The external memory can be substantially any relevant memory such as, but not limited to, one or more of flash memory secure digital (SD) card, universal serial bus (USB) stick or drive, other memory cards, hard drive and other such memory or combinations of such memory. The memory 514 can store code, software, executables, scripts, data, content, lists, programming, programs, log or history data, user information and the like.

Some embodiments provide systems that monitor network communications (e.g., Internet communications) and/or network use of a selected user to and/or from a computing device. Some systems and/or methods according to the present embodiments may be installed on a computing device that receives data transaction requests. The devices and systems according to the present embodiments can be configured to process data transaction requests received, for example through a user interface. Typically, the present embodiments can be communicatively connected to a communication network (e.g., a WAN, LAN, the Internet, etc.), and are configured to process and complete the data transaction requests. The devices and systems according to the present embodiments can be communicatively connected with one or more remote servers that are configured to provide information useful in determining the nature of one or more data transaction requests. In some implementations, the devices and systems according to the present embodiments may include and/or have access to monitoring software configured to monitor network access activity to and/or from the computing device, which is typically activated by the user. The monitoring can include monitoring the network activity of applications installed on the computing device. In some embodiments, the monitoring program is further configured to record the results of the monitoring of the network access activity locally on the computing device and/or at a remote server and/or service. The network activity can include substantially any relevant network activity such as, but not limited to, access to at least one network activity from a group consisting of http, https, network news transfer protocols, file sharing programs, file transfer protocols, chat room access, peer to peer chats, game protocols, downloads of data, electronic mail activity, and other such activity. The devices and systems according to the present embodiments can further complete a data transaction request through the interface.

In some embodiments, a remote server may generate a report including information useful in determining the nature of the data transaction requests. The server and/or the computing device may make the report accessible by one or more third party recipients. Further, in some applications, the remote server is implemented through and/or includes a server cluster containing multiple servers that cooperatively operate and/or communicate to provide the monitoring and/or analysis functionality. In other instances, the remote server may be implemented in part or fully on personal computer. In some embodiments, the remote server includes a processing program that analyzes the content and/or payloads of the network access activity (e.g., data transactions) and assigns a score to each of the network access activity. The score and/or the content of the network activities provides an indication of whether the network access activity is considered an objectionable activity.

The devices, systems, and methods according to the present embodiments may further block access to the network access activity when the network access activity is considered an objectionable activity. The determination of objectionable activity, in some implementations, includes an analysis of data transactions and/or payloads of data packets of data transactions relative to one or more rules. As such, objectionable activity may be identified as a violation of criteria defined by prescribed rules established and/or maintained on the computing device and/or at the remote server. In some embodiments, the system allows a user, owner of the computing device, owner of a service providing network access and/or other such entities to establish a set of rules and/or criteria. The present embodiments can then block network access activity when the established rules and/or criteria are met. Rules and/or criteria can include, but are not limited to, specified keywords, one or more domains, date, time, and Internet Protocol (IP) addresses, and other such rules and/or criteria.

The processing program and/or a remote server can generate a report of the network access activity. The report can include, for example, a list of recorded network access activity, a score assigned to each recorded network access activity, corresponding rules and/or criteria considered, corresponding rules violated, corresponding criteria meet, and other such information. The report may be made accessible by a user being monitored, a corporation or other entity requesting the monitoring, one or more third party recipients and the like. Similarly, the report may be communicated to a user being monitored, a corporation or other entity requesting the monitoring, one or more third party recipients, and the like. In some implementations, the report may display a list of recorded network access activity, which may be sorted based on one or more parameters, such as by score, IP address, data size, rules violated, criteria meet, by time, by date, other such parameters, or combination of two or more of such parameters. For example, the report may display the list of recorded network access activity sorted chronologically. In some implementations, the report can include multiple portions with one portion including one or more links to one or more other portions.

Further, as introduced above, in some embodiments the monitoring and/or analysis can include assigning one or more ratings, scores or the like to one or more of the network access activity. The score can include a numeric score and/or a relative score. For example, the relative score ca be a letter or other symbol.

Third party recipients can access one or more reports in a variety of ways including, but not limited to, the report or reports being communicated by one or more of the remote servers, the third party having access to the remote server to request report, and other such methods. A request for a report can include viewing the report while the third party has access to the remote server.

In some embodiments, a monitoring application is installed on the computing device 50. Additionally or alternatively, some or all of the monitoring and/or the monitoring application is implemented at a remote server. In some applications, the monitoring application can be voluntarily installed on the computing device by a user. In other instances, the monitoring software can be pre-installed on the computing device.

Further, some embodiments provide systems for monitoring network use by one or more selected users. The system can include a computing device having installed thereon devices and/or software applications according to the present embodiments that receives data transaction requests from the computing device through an interface. The present embodiments may process data transaction requests received through the interface. Additionally, devices and systems according to the present embodiments are configured to connect to a communication network (e.g., WAN, LAN, Internet, etc.), and have the capability of completing the data transaction requests. In some implementations, the present embodiments include a processing program capable of providing information to a third party recipient. The processing program is capable of communicating results of processing to other portions of the present embodiments. For example, the processing program is configured to provide information useful in determining the nature of the data transaction request.

In some embodiments, the systems described herein include monitoring software that is configured to monitor network access activity of a user. The monitoring performed by such monitoring software can include monitoring the network activity of applications installed on the computing device. In some embodiments, the monitoring program records the results of the monitoring of the network access activity on the computing device and in some instances within the processing program. The network access activity can include, for example, access to one or more of the network activity from a group consisting of: http, https, network news transfer protocols, file sharing programs, file transfer protocols, chat room access, peer to peer chats, game protocols, downloads of data, and electronic mail activity. The devices and systems according to some of the present embodiments can complete the data transaction request through the interface. In some embodiments, the processing program can generate a report including information useful in determining the nature of the data transaction requests. In some implementations, the report can be made accessible by a third party recipient (e.g., via direct access through a server 10, e-mail, periodic reports, text alerts, etc.). In some embodiments, the processing program is configured to analyze the content of each network access activity and assign a score to each of the recorded network access activity. The score and the content provides an indication of whether the network access activity is considered an objectionable activity.

In some instances, the systems and methods according to some of the present embodiments block access to the network access activity and/or a server when the access activity is considered an objectionable activity. The analysis in identifying objectionable activity can include detecting a violation of one or more criteria defined by prescribed rules established in the processing program and/or external analysis rules. Again, the objectionable activity can be a violation of prescribed rules established in the present embodiments, remote server prescribed rules or the like. In some instances, a user can establish the set of criteria, which may include causing the present embodiments to block the network access activity when the user-established criteria are met.

Criteria considered by the monitoring functionality and/or the remote server can include, but is not limited to, one or more of specified keywords, domains, date, time, IP address of network access activity, and other such criteria. The objectionable activity can be determined by violation of rules for data transaction requests that can include, but are not limited to, one or more of keywords, domains, date, time, and network address of said data transaction request, and the like. In some embodiments, the systems and methods described herein generate one or more reports based on the monitoring and/or the analysis. The report can include, for example, a list of recorded network access activity and scores assigned to of the recorded network access activity. The report can display the list sorted by said score, sorted chronologically, or other such sorting, or combination of such sorting. The report may include portions and one or more portions may include a link to one or more other portions. The scoring can be a numeric score and/or a relative score. Further, the relative score may be a letter or other symbol.

Again, third party recipients may have access to the report. Access may be achieved through one or more ways, such as but not limited to one or more of said processing program sending the report, the third party having access to the processing program to request the report. A request may include viewing the report while the third party has access to the processing program. In some applications, the monitoring functionality is implemented at least in part through software installed on the computing device. Additionally or alternatively, some or all of the monitoring is implemented at a remote server communicatively connected with the present embodiments. The monitoring software may be voluntarily installed on the computing device by a selected user. In other instances, the monitoring software is pre-installed on the computing device.

One or more of the embodiments, methods, processes, approaches, and/or techniques described above or below may be implemented in one or more computer programs executable by a processor-based system. By way of example, such a processor-based system may comprise the processor-based system 500, a computer, a server, a smart phone, a table, a laptop, etc. Such a computer program may be used for executing various steps and/or features of the above or below described methods, processes and/or techniques. That is, in some aspects, the computer program may be adapted to cause or configure a processor-based system to execute and achieve the functions and/or functionality described above or below. For example, such computer programs may be used to monitor a local computing device and, in particular, monitor a local computing device by capturing all packets of data requests intended to be communicated from and/or to the local computing device, analyzing the packets of the local computing device, and completing a predetermined requested data transaction. As another example, such computer programs may be used to monitor a local computing device and, in particular, monitor a local computing device by capturing all packets on a local computing device, analyzing the packets from the local computing device, and completing a predetermined requested data transaction. As yet another example, such computer programs may be used for implementing any type of tool or similar utility that uses any one or more of the above or below described embodiments, methods, processes, functionality, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Some embodiments described herein provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, functionality, approaches, and/or techniques described herein. For example, some embodiments provide one or more computer-readable storage mediums storing one or more computer programs for use with a computer simulation, the one or more computer programs configured to cause a computer and/or processor based system to execute steps comprising: receiving data through the present embodiments that receives data transaction requests, from a local computing device on which the present embodiments are implemented, through an interface; and processing, through the present embodiments, data transaction requests received through said interface. Some embodiments further comprise completing said data transaction requests through the present embodiments that is communicatively connected via a wide area network (WAN) to a remote server which is communicatively connected to said present embodiments; wherein said remote server is configured to provide information useful in determining a nature of said data transaction request. Some embodiments additionally or alternatively comprise monitoring network access activity of the local computing device, including network activity of applications installed on said local computing device; recording results of monitoring said Internet access activity within said remote server. Additionally, some embodiments further comprise completing a data transaction request, by the present embodiments, through an interface. Further, in some instances, the Internet access activity can include access to at least one Internet activity from a group consisting of http, https, network news transfer protocols, file sharing programs, file transfer protocols, chat room access, peer to peer chats, game protocols, downloads of data, and electronic mail activity.

In some embodiments, systems, apparatuses and methods are provided herein useful to obtain product information through scanning. In some embodiments, a method performed by a circuit and/or one or more processors comprises receiving, through an interface and by a, data transaction requests from a local computing device on which the present embodiments are implemented; processing, by the present embodiments, the data transaction requests received through said interface; and completing said data transaction requests through a communication connection with a wide area network (WAN).

Some embodiments further comprise providing information to a third party recipient through processing functionality and/or programming of the present embodiments. Further, some embodiments comprise communicating, through the processing functionality, results of the processing to other portions of the present embodiments. Additionally, one or alternatively, more embodiments comprise providing, through the processing functionality, information useful in determining a nature of the data transaction request.

Some embodiments further comprise monitoring network access activity of the local computing device through monitoring circuitry and/or functionality of the present embodiments. In some instances, the network access activity comprises network activity of applications installed on the local computing device. Further, some embodiments comprise recording results of monitoring the network access activity within the processing functionality. The network activity comprises, in some embodiments, network activity from one or more of and/or a group consisting of http, https, network news transfer protocols, file sharing programs, file transfer protocols, chat room access, peer to peer chats, game protocols, downloads of data, and electronic mail activity. Further, some embodiments comprise completing the data transaction, by the present embodiments, through the interface.

In some embodiments, one or more of the circuitry and/or functionality may be implemented external to the present embodiments and/or the present embodiments may be implemented through distinct circuitry, processors and/or functionality. For example, in some implementations, the monitoring functionality may reside on the local computing device independent from the present embodiments, and be configured to send and receive data to the present embodiments. Accordingly, the spirit and scope of the present embodiments is not to be limited to the specific embodiments described.

Some embodiments provide services and methods that monitor a local computing device and, in particular, monitor a local computing device by capturing all packets of data requests intended to be communicated from the local computing device, analyzing the packets of the local computing device, and completing a predetermined requested data transaction.

Further, some embodiments provide services and methods that monitor a local computing device and, in particular, monitor a local computing device by capturing all packets on a local computing device, analyzing the packets from the local computing device, and completing a predetermined requested data transaction.

With reference to FIG. 14A, an exemplary operating system can offer an array of graphical features to create both a visually pleasing and functional user experience by using a technique called alpha blending, which is used to create the appearance of stacked transparent windows. For example, in FIG. 14A, screen 1402 is illustrated as having three layers including a desktop/background image 1404 of an operating system window that is displayed to a user, 1406 represents a window including content (e.g., Application) that was determined to be blocked, and 1408 represents an overlay window, which is non-transparent in the area that corresponds to the blocked content of window 1406, but transparent everywhere else. Accordingly, the position and dimensions of image 1902 on overlay 1408 correspond to the position and dimensions of the blocked Application layer 1406 and is thus obscured by the non-transparent portion (image 1902, FIG. 19) of the overlay 1408, but other portions of the window 1406 and/or the desktop window 1404 are visible through the transparent portion of the overlay window 1408. In this way, the user can see the stacked layers in the Z-order (represented by the arrow 1410) of a windowing graphical user interface to see multiple stacked windows at one time. Notably, in some aspects, the screen 1402 can be achieved by for combining the graphical output of windows (from different applications) together into a single, final rendered screen (e.g., screen 1402 in FIG. 14B) that the user sees. The operating system can be also responsible for considering attributes of each window (such as transparency) and then rendering it according to those attributes.

Figures 15A, 15B, 15C:
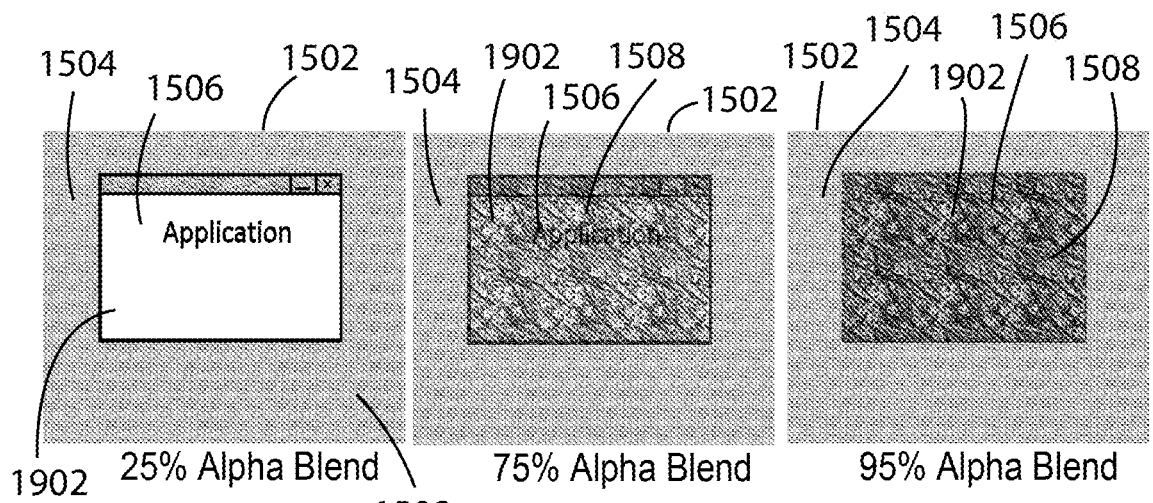
FIG. 15A illustrates an exemplary final rendered image with 25 Percent Alpha Blend in accordance with some embodiments.
FIG. 15B illustrates an exemplary final rendered image with 75 Percent Alpha Blend in accordance with some embodiments.

When applications programmatically set their window as transparent, they must also set the alpha value which specifies the relative weight to give their window compared to layered windows that may appear below it. The heavier the alpha value the more visible their window will be relative to the window(s) below it. FIGS. 15A, 15B and 15C show a comparison of alpha blend weights at 25 percent, 75 percent and 95 percent respectively of image 1902 (FIG. 19) of overlay 1408 of FIG. 14B. As shown, in the FIGS. 15A-C, the screen image 1502 shows background layer 1504, blocked content 1506, and transparent overlay 1408 having various blend weights of image 1902.

Figures 16A, 16B:
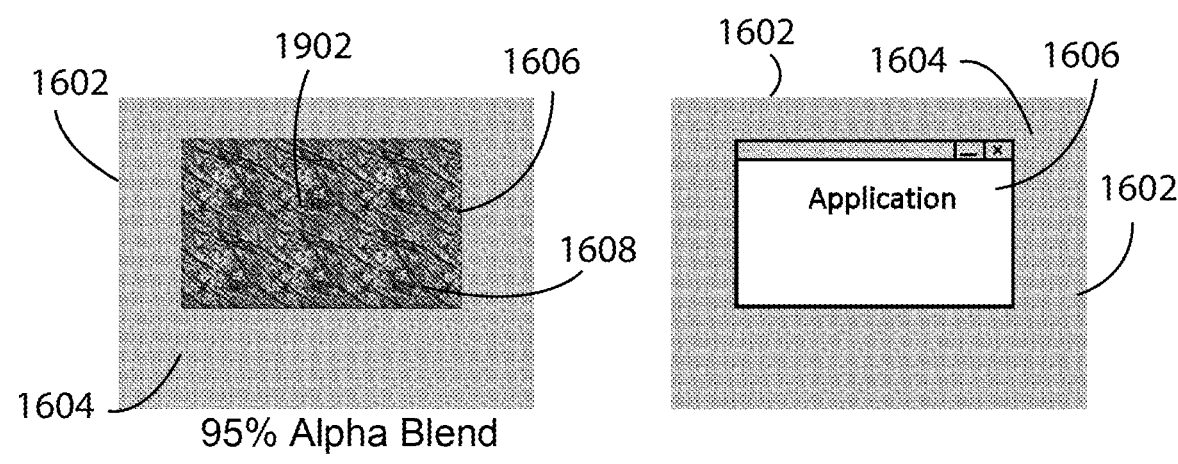
FIG. 16A illustrates a 95 Percent alpha blend window with a complex image for the overlay according to the present embodiments.
FIG. 16B illustrates a reversed alpha blend window with a complex image for the overlay of FIG. 16A according to the present embodiments.

The typical function for alpha blending is, $$g(x)=(1-\alpha)f_0(x)+\alpha f_1(x)$$

where the composite image g(x) is the blending of two images $f_0$ and $f_1$. Alpha is a measure of image intensity, and it is inversely proportional between $f_0$ and Reverse-Alpha Blending may optionally also be used to unveil the altered window. By drawing a window that is heavily translucent (95% alpha blend), the underlying window is basically hidden from the user's point of view. This is especially true when the overlay window is a complex image, such as image 1902 rather than a single color or simple pattern. FIG. 16A illustrates an image with a 95 percent alpha blend of image 1902 in overlay layer 1608 with the same background layer 1604, and blocked content layer 1606. In this instance, while the user may be unable to ascertain the underlying image, an application with full knowledge of the original overlay image and the alpha value used can reverse an alpha blend using the following function:

$$f_0(x) = \frac{g(x) - \alpha f_1(x)}{1-\alpha}.$$

The result (i.e. f(x)) is the original image, such as illustrated in FIG. 16B without overlay layer 1608. In this way, the application displaying the overlay, or any other application with knowledge of the overlay, can use the final rendered image (i.e. the screenshot) to view the veiled underlying window(s). The overlay application can continuously monitor the underlying application(s) where the user has no knowledge of the underlying application user interface elements.

Figure 17A:
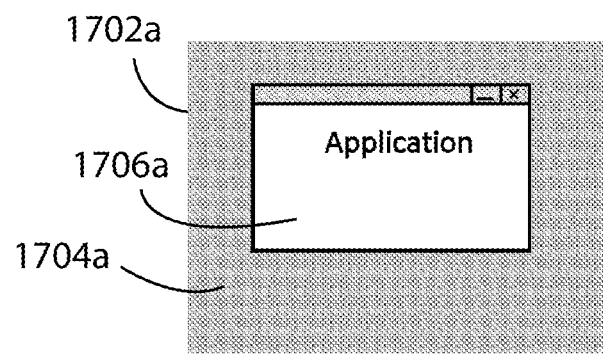
FIG. 17A illustrates a 0 percent alpha blend window (not masked/transparent) with a complex image for the overlay according to the present embodiments.
Figure 17B:
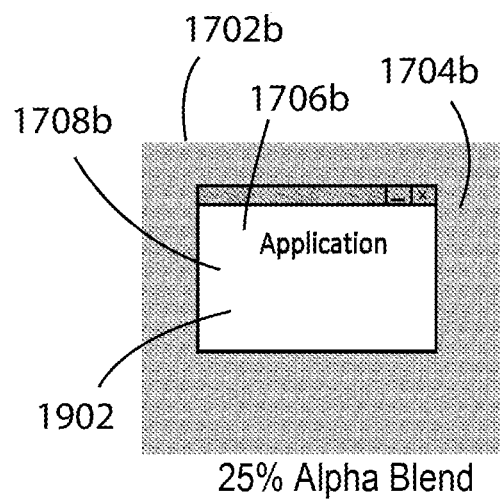
FIG. 17B illustrates a 25 percent alpha blend window (25 percent masked/opaqueness) with a complex image for the overlay according to the present embodiments.
Figure 17C:
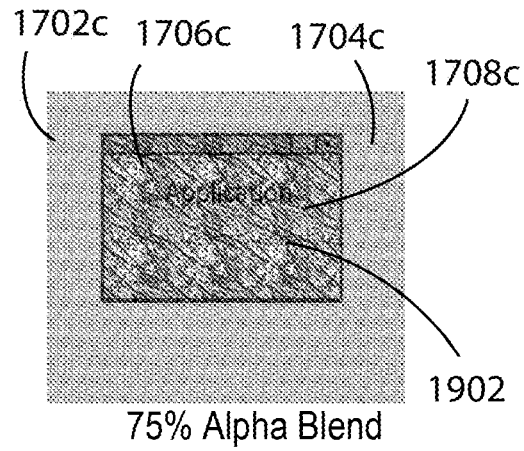
FIG. 17C illustrates a 75 percent alpha blend window (75 percent masked/opaqueness) with a complex image for the overlay according to one approach of the present embodiments.
Figure 17D:
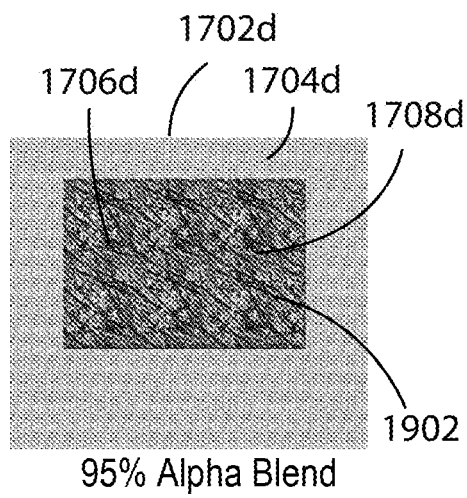
FIG. 17D illustrates a 95 percent alpha blend window (95 percent masked/opaqueness) with a complex image for the overlay according to the present embodiments.
Figure 17E:
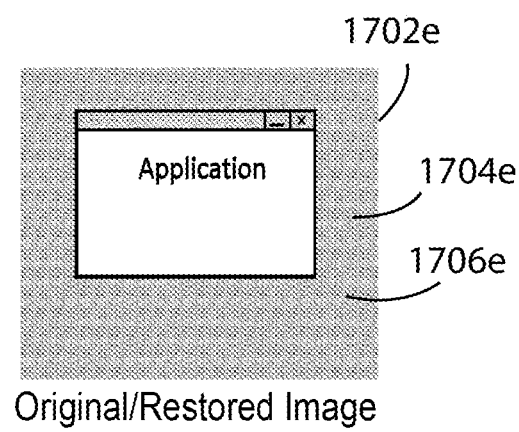
FIG. 17E illustrates a 0 percent alpha blend window (unveiled/transparent) with a complex image for the overlay according to the present embodiments.
Figure 18:
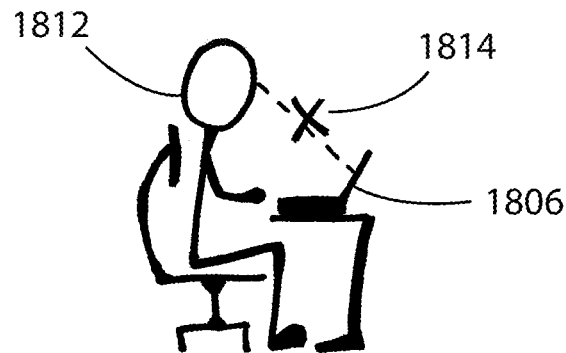
FIG. 18 illustrates a user viewing a computing device having a system according to the present embodiments installed thereon.

An alpha-blend masking and protected unveiling process may be applied so that a user 1812 in FIG. 18 is blocked from viewing 1814 the screen output of a computing device 1806. According to one approach for the present embodiments, and only for exemplary purposes, an application (or several applications) displaying a window (or several windows) on a computer monitor that will soon be masked from the human viewers. A sequence of screenshots shown in FIGS. 17A-17E show the effect of the present embodiments from an unmodified an screen 1702 in FIG. 17A, to three levels of alpha-blending FIGS. 17B-D as the result of a command to modify the screen image, to a restored reverse alpha-blended screen in FIG. 17E. Accordingly, FIG. 17A shows an unmodified screen 1702a having a background 1704a, and an application window 1706a. In FIG. 17B, in response to a command by the present application to modify the screen to be 25 percent alpha blended over application 1706b, screen 1702b shows an unmodified background layer 1704b, and only a slight masking of the content of application layer 1706b by image 1902 on overlay layer 1708b. In FIG. 17 C, in response to a command by the present application to modify the screen to be 75 percent alpha blended over application 1706c, screen 1702c shows an unmodified background layer 1704c, and only masking of the content of application layer 1706c by image 1902 on overlay layer 1708c. In FIG. 17D, in response to a command by the present application to modify the screen to be 95 percent alpha blended over application 1706d, screen 1702d shows an unmodified background layer 1704d, and only a severe masking of the content of application layer 1706d by image 1902 on overlay layer 1708d. In FIG. 17 B, in response to a command by the present application to cease modifying the screen, screen 1702e shows an unmodified background layer 1704e and application layer 1706b, since there is now no overlay layer. It is noted that it is also just as possible to display the masked image from the initiation of the application so that the displayed window with content to be modified would never be clearly visible to human viewers.

According to another approach, the masking application (which can possibly be a completely separate application from those mentioned herein) can create an overlay window 1708 corresponding to area 1704 over the areas that are to be masked; however, this window does not yet have any visible attributes. In other words, such as in FIGS. 17A and 17E, window 1708 initially has an exemplary transparent window disposed on top of the dimension parameters of window 1704. The dimensions and area of window 1708 can also move to maintain the area corresponding to the area of window 1704.

Figure 19:
FIG. 19 illustrates an exemplary image that may be used to mask all or a portion of screen output for a device at various alpha-blending levels.

As commanded by the system, window 1708 can thus be 'painted' with a known image (known as the masking image), such as image 1902 in FIG. 19. Image 1902 can, for example, be stored in the device's memory. The transparency of image 1902 can be set by attributes for window 1708, which are set to alpha blend. In FIGS. 17A and 17E, the alpha blend value is set to 0 percent. Note that these steps can occur simultaneously from the perspective of user 1812. An alpha blend of 95 percent is a preferred modification, so that the underlying image is difficult to impossible to decode quickly or with precision by a user.

The application uses the screenshot (g(x)), the original masking image 1902 ($f_1(x)$). The alpha blend value ($\alpha=0.95$) in the following formula can be used to retrieve (unveil or recover) the underlying application(s) image ($f_0(x)$). The following calculation can be performed in-memory and the resulting image is NOT displayed to the human viewers:

$$f_0(x) = \frac{g(x) - \alpha f_1(x)}{1 - \alpha}.$$

The result (i.e. $f_0(x)$) is the original image such as shown in FIG. 17E.

The alpha blending can occur in a variety of configurations. The following are exemplary configurations to assist in understanding the present embodiments.

According to one approach, the application can block content that is not allowed (but only while visible). In other words, content that is predetermined to be subject to masking, altering or obscuring ('blocking') is only blocked while visible from the output of a device to a video screen. Again, it is noted that blocking can optionally include masking, altering, obscuring and/or turning off the audio of the device. In this embodiment, an application may be in the state where it displays some content that is not allowed for the current user. That is, it does not stop or alter the offending application. This might include sensitive or objectionable information or media. The present application can be monitoring for this information to become visible, and then places a translucent overlay over the offending window to veil the content from view. Once veiled, the "watcher application" can continuously (or periodically) poll the visible screen and perform a reverse-alpha blend using its knowledge of the overlay image once the objectionable material is removed. The application can continue to score the unveiled image. Accordingly, when the objectionable or sensitive information is no longer visible, the application that put up the overlay may then remove it such that the underlying application is now in full view for the user. The watcher application does not need to directly interact with the application that was veiled, rather it uses operating system functions to gather information about the application and the visible screen to determine when it should display and remove the translucent overlay.

With reference to an exemplary method that may be implemented to achieve the functionality provide by this embodiment, the "watcher application" may loop as follows:
  i. Attributes for all top-level windows on the display are captured into a list of window attributes. This includes location, size, and z-order. At the same time, a screenshot of the entire desktop (across all monitors) is taken.
  ii. If any of the windows are masking windows created by the watcher, then the reverse alpha blend process is performed so the masking windows are removed from the screenshot image.
  iii. The visible portion of each window is scored using one or more of the present embodiments.
  iv. If one of the windows contains content that should be blocked, and it isn't currently blocked, the watcher application will create a window "above" the window to be blocked, and paint the masking image, creating a controlled image.
  v. If one of the windows that was blocked no longer needs to be blocked, the watcher application will delete the overlay window it had created previously, recovering the original image for each input image.
  vi. The watcher application will continue to perform these steps in a loop.

According to another exemplary approach, the application can unveil content for privileged devices using remote access software. In this embodiment, multiple (two or more) devices may access the same screen, but only certain devices have the privilege of seeing this content unveiled. In some embodiments, privileged users (e.g. security staff) may access functions or applications from a non-privileged user's computer using a remote access program. When the remote access program logs in, it can veil all or part of the screen using a translucent overlay. In some aspects, the remote access program will use reverse alpha blending to see the unveiled screen on a remote computer while the non-privileged user cannot ascertain the information under the overlay.

According to another exemplary approach, the application can unveil content for privileged devices using smart camera glasses for a user to use. Like the previous approach above, multiple (two or more) devices may access and display the same screen, but only certain devices (and thus its corresponding users) have the privilege of seeing this content unveiled. In some embodiments, privileged users (e.g. security staff) may access functions or applications from a non-privileged user's computer using smart camera glasses. An application on the computer will veil all or part of the screen using a translucent overlay. In some aspects, the smart camera glasses worn by the privileged user will use reverse alpha blending to see the unveiled screen while the non-privileged user cannot ascertain the information under the overlay.

According to another approach, the application can unveil content for privileged devices using Smart Camera with Display. Similar to the previous approach above, multiple (two or more) devices may access the same screen, but only certain devices have the privilege of displaying the content unveiled. Rather than smart camera glasses, the privileged user can use a device (handheld or otherwise) with camera and display (e.g. a smartphone).

Figure 6:
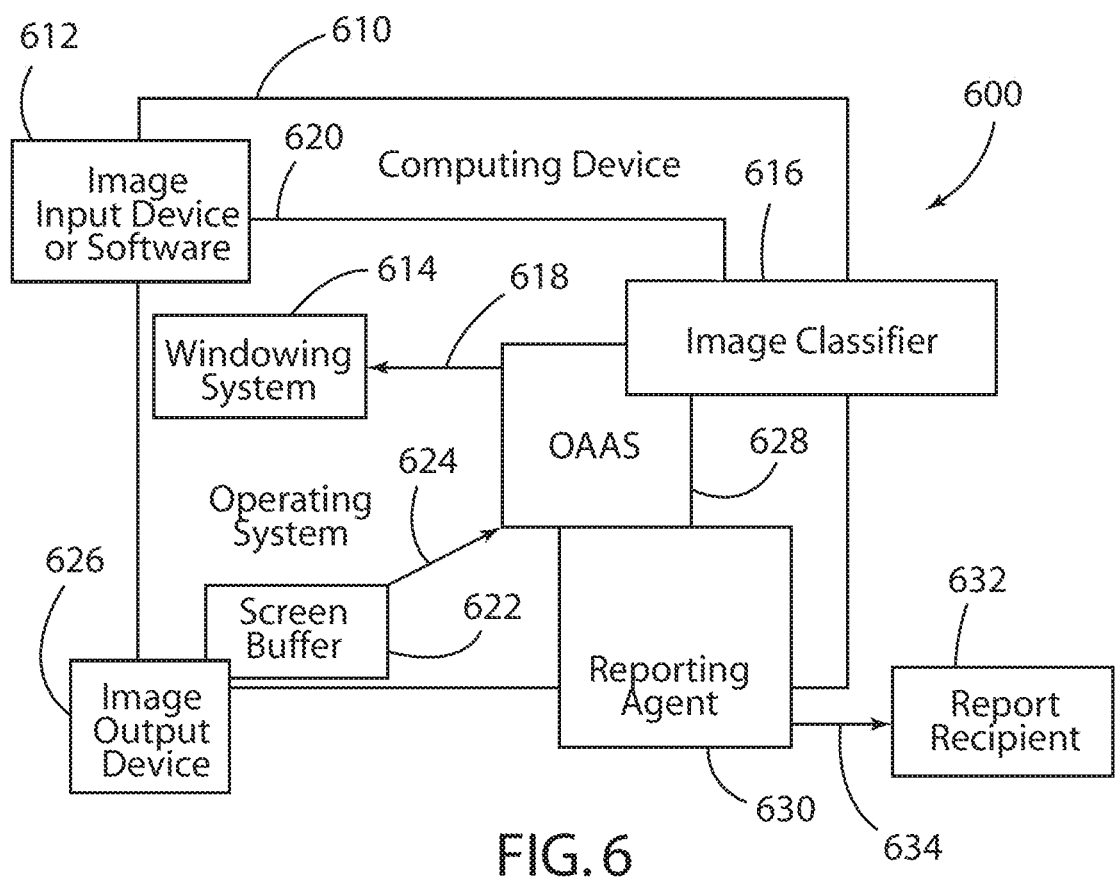
FIG. 6 illustrates a schematic of an exemplary system to monitor, filter, and/or block select image access activities of a computing device, including obscuring viewed images, in accordance with some embodiments.

FIG. 6 illustrates a schematic of an exemplary system 600 to monitor, filter, and/or block select image access activities of a computing device, including obscuring viewed images. In the embodiment illustrated in FIG. 6, computing device 610 has installed on it, or is communicatively connected to an image input device 612 and an image output device 626 (such as a screen). In addition, in the embodiment illustrated in FIG. 6, computing device 610 has installed an operating system 620 which may be a hardware or software operating system. The operating system 620 has installed on it a Windowing System 614 and a Screen Buffer 622 which is communicatively connected to the image output device 626. In addition, as shown in FIG. 6, an Obscuring and Analysis System (OAAS) 628 is installed on the computing device 610. In some aspects, the OAAS 628 is communicatively connected to, or optionally has installed within the OAAS 628, an image classifier 616 which may be also be installed on the computing device 610, or may be external to the computing device 610. In some embodiments, the OAAS 628 may include, or may be communicatively connected to the reporting agent 630. The reporting agent 630 may be installed on computing device 610 or may be external to computing device 610 (such as on a remote server). In some aspects, reporting agent 630 is configured to send a report to a report recipient 632 via output 634, as shown in FIG. 6.

In some embodiments, the computing device 610 is configured to store input images for an indefinite time before the images are called or otherwise scheduled for display. With reference to FIG. 6, an exemplary embodiment of a method of monitoring and/or blocking, modifying, or obscuring an image is described below. In one aspect, a first image is input into the operating system 620 through image input device 612 and the operating system passes the first image optionally through windowing system 614, after which the first image is received by screen buffer 622 and is output through the image output device 626. In some embodiments, the screen buffer 622 also communicates via 624 the first image to the OAAS 628, which in some embodiments communicates the first image to the image classifier 616 (in other embodiments, the screen buffer 622 can communicate the first image directly to image classifier 616). Image classifier 616 classifies the first image as clean or non-clean as described above, and said classification is communicated to the OAAS 628. OAAS 628 may optionally send content or meta-content, or the first image itself, to reporting agent 632, which in turn may send said content, either immediately or later, and either alone or aggregated with content about other images, to report recipient 632.

In some embodiments, if the first image is clean, OAAS 628 takes no other action with the image. If the first image is non-clean, OAAS 628 causes windowing system 614 via output 618 to change (by blocking or obscuring) the data in screen buffer 622, or a portion thereof, to a controlled image, which may be alpha-blended, such that the original image shown on output device 626 is obscured and modified to become a controlled image such that the original image shown on output device 626 is obscured and modified to become a controlled image. In some embodiments, the controlled image becomes the topmost window in the z-ordering (described herein) process of windowing system 614. In some embodiments, an alpha blending process is used to obscure the original image into the controlled image, for instance by OAAS 628 generating, or causing to be generated, an overlay image to be alpha-blended. In those embodiments, after being displayed on the image output device 626 for a very brief time, the non-clean first image becomes an underlying (background) image to the overlying image (foreground image), which may be an overlay image generated by the OAAS 628. In some embodiments, the overlay image of the alpha blending process may be selected from one or a group of images otherwise available to the windowing system 614. In some aspects, any new image input into image input device 612 which either is the first image of a viewing session, or which follows a clean image, is treated as a first image.

In some embodiments, when a non-clean image has been obscured and modified through an alpha-blending process by OAAS 628 and/or windowing system 614, any next image is automatically obscured by using an alpha-blending process. In this case, OAAS 628 generates an obscured image, or alternatively selects an image from a group of images available to windowing system 614, and causes the windowing system 614 to make a controlled image the topmost window in the z-ordering process of windowing system 614. Alternatively, in some embodiments, if the non-clean image to be blocked, modified, or obscured is in a window that is not the topmost window, but is subordinate to a window that has only clean images (that is, a "clean window"), the window with the controlled image may be subordinate in the z-order to the clean window.

In some embodiments, the controlled image is an alpha blended image. When the controlled image is an alpha blended image, a next image following a non-clean image can become an underlying (background) image to the overlay image (foreground image), and so that next image (following a non-clean image) can be an underlying image that is obscured. Any instance in which an alpha blending process is used (such that the overlay image is not completely opaque) may result in a reverse alpha-blending process as described herein, or the OAAS 628 may select images to be reverse alpha-blended according to a schedule based on time or on the number of images that have been replaced by controlled images, in the case in which not all images are to be analyzed by OAAS 628. In some embodiments, reverse alpha-blending is used on selected controlled images to recover the underlying image for analysis. For example, the OAAS 628 may determine that every fifth alpha-blended image should be reverse alpha-blended and analyzed; or, OAAS 628 may determine that alpha-blended images should be reverse alpha-blended every half-second, in which case, the image that is not viewed (the underlying image) may be completely obscured (opaque, or 100% alpha-blended), in which case it is not reverse alpha blended.

In some embodiments, when the OAAS 628 determines that a next image should be reverse alpha-blended for recovery and analysis, OAAS 628 may cause the windowing system 614 to make the controlled image the topmost window in the z-ordering process of windowing system 614. Alternatively, in some embodiments, if the non-clean image to be blocked, modified, or obscured is in a window that is not the topmost window, but is subordinate to a window that has only clean images (that is, a "clean window"), the window with the controlled image may be subordinate in the z-order to the clean window. Thus, in some aspects, a next image following a non-clean image becomes an underlying (background) image to the overlay image (foreground image), and that next image is an underlying image that is not viewed but can be recovered by reverse alpha-blending. In some embodiments, if, after reverse alpha-blending, OAAS 628 determines that image to be clean, no further action is taken with a new image input into input device 612. In some embodiments, if, after reverse alpha-blending, OAAS 628 determines that image to be non-clean, the OAAS 628 once again blocks or modifies and obscures said first image by causing windowing system 614 to send a controlled image to screen buffer 622 such that the image shown on output device 626 is the obscured and modified controlled image and the controlled image is processed in the z-ordering process of windowing system 614 in the same way as the previous image, and the process continues.

In some embodiments, OAAS 628 may also be configured to receive an image directly from the image input device 612 and send an image directly to screen buffer 622 and/or image output device 626.

In some embodiments, OAAS 628 is embedded in computing device 610 and/or operating system 620 such that the first image can be analyzed and processed by OAAS 628 without the first image being viewed, even for a short time. In those embodiments, image input device 612, windowing system 614, or screen buffer 622 are configured to send (arrow 624) the image, or content about the image, to OAAS 628 before outputting the image to image output device 626. In those embodiments, the first image sent (arrow 624) to OAAS 628 is analyzed. In some aspects, if the image is clean, no further action is taken, but if the image is non-clean, OAAS 628 causes windowing system 614 to change (by blocking or obscuring) the image to be displayed on image output device 626 to a controlled image, which may be alpha-blended, such that the original image is obscured and modified to become a controlled image.

In some embodiments, OAAS 628 is configured to retain content and/or metadata on each image analyzed, and is also configured to generate a report which is passed to a Reporting Agent 630 which in turn may send said content, either immediately or later, and either alone or aggregated with content about other images, to report recipient 632. In some aspects, reporting Agent 630 resides within the OAAS 628, or within the computing device 610, or external to the computing device 610, such as a on remote server or servers. In some embodiments, OAAS 628 reports to Reporting Agent 630 content about the image, as well as metadata about the image.

Figure 7:
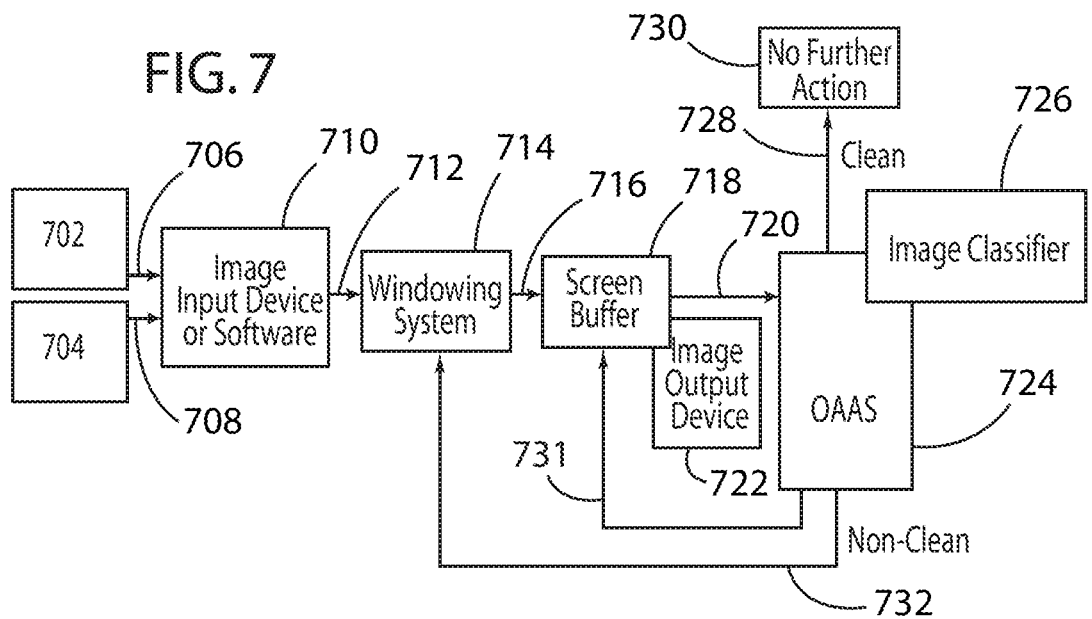
FIG. 7 illustrates an exemplary system according to the present embodiments, depicting actions taken, for the first image of a viewing session; or for any image (including an image that is non-clean) following one or a series of images classified as clean.

FIG. 7 illustrates, in an exemplary system and method of the current embodiments, actions taken, for the first image of a viewing session; or for any image (including an image that is non-clean) following one or a series of images classified as clean.

In FIG. 7, image 704 represents the first image of a viewing session; or any image (including an image that is non-clean) following one or a series of images 702 classified as clean. As can be seen in FIG. 7, image 704 is input via 708 into image input device 710 then to windowing system 714 via out 712. In some embodiments, windowing system 714 implements appropriate actions to pass image 704 to screen buffer 718, which in turn allows image output device 722 to display the image 704. In one aspect, OAAS 724 analyzes the image 704 using data from screen buffer 718 and/or image output device 722 via 720, and, using image classifier 726 determines if image 704 is clean or non-clean. In some embodiments, if the image is determined to be clean, no further action (730) is taken via output 728, but if the image is determined to be non-clean, OAAS 724 causes (arrow 731) screen buffer 718 and/or image output device 722 to block and/or replace, or alternatively obscure (using an alpha-blending process) image 704, resulting in a controlled image that is passed directly (arrow 731) to the screen buffer 718 and/or image output device 722. In some embodiments, OAAS 724 causes (arrow 732) windowing system 714 to replace, and/or obscure image 704, which results in a controlled image that may be passed to windowing system 714 to the screen buffer 716 via output 716 and image output device 722 for viewing. The net effect of the described process is that image 704 would be visible to a user of the selected computing device, but if non-clean would be replaced quickly by a controlled image.

Figure 8:
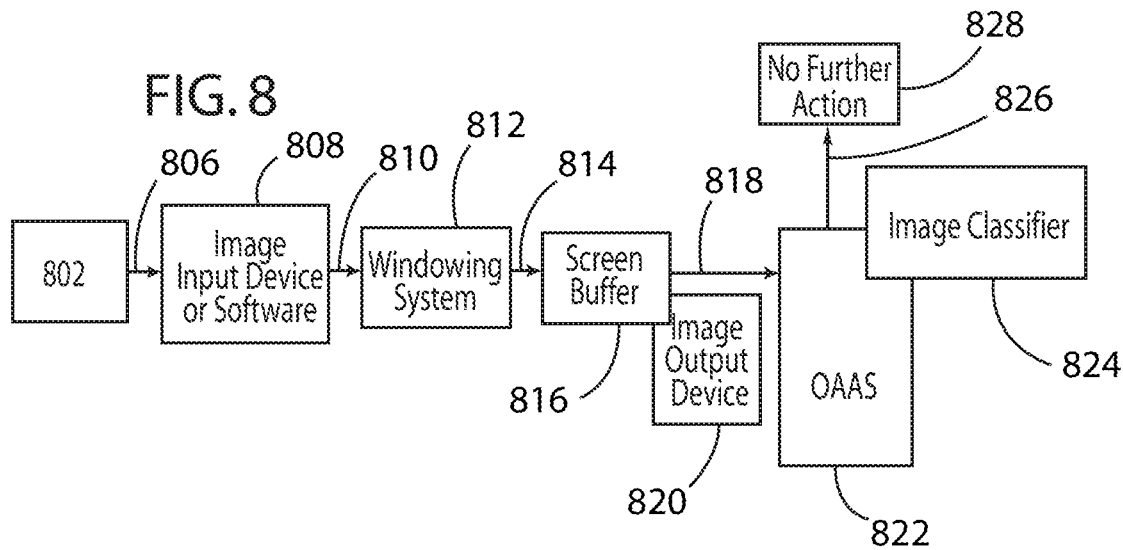
FIG. 8 illustrates an exemplary system and method according to the present embodiments, and recapitulating a portion of FIG. 7 to depict actions taken for any clean image following one or a series of images classified as clean.

FIG. 8 further illustrates, in an exemplary system and method according to some embodiments, and recapitulating a portion of FIG. 7, actions taken for any clean image 802 following one or a series of images classified as clean. Here, image 802 can represent a clean image following one or a series of images classified as clean. Image 802 is input into image input device 808 via output 806. In some embodiments, windowing system 812 via output 810 implements appropriate actions to pass image 802 to screen buffer 816 via output 814, which in turn allows image output device 820 to display the image 802. In one aspect, from output 818, OAAS 822 analyzes the image 802 using data from screen buffer 816 and/or image output device 820, and, using image classifier 824 determines if image 802 is clean or non-clean. Because image 802 is clean, no further action (828) is taken via output 826. The net effect of the described process is that image 802 would be visible to a user of the selected computing device, unobscured and unmodified by OAAS 824.

FIG. 9 illustrates, in an exemplary system and method according to some embodiments, actions taken for a clean image following an image classified as non-clean. Image 902 represents an image that is classified as clean but follows an image classified as non-clean. As shown in FIG. 9, image 902 is input via 904 into image input device 906, then to windowing system 910 via output 908. In some embodiments, OAAS 918 causes (926) windowing system 910 to replace, modify, or obscure image 902 by a controlled image, wherein said controlled image becomes the topmost window and then is passed on via 912 to the screen buffer 914 and image output device 928 for viewing. Alternatively, in some embodiments, if image 902 is in a window that is not the topmost window, but is subordinate to a window that has only clean images (that is, a "clean window"), the window with the controlled image may be subordinate in the z-order to the clean window. In some aspects, when alpha-blending is used to obscure image 902, the alpha-blended image becomes the controlled image. In one approach, windowing system 910 implements appropriate actions to pass the controlled image to screen buffer 914, which in turn allows image output device 928 to display the controlled image. In some embodiments, when alpha-blending is used to create the controlled image, OAAS 918 reverse-alpha blends the controlled image to recover image 902 using data from windowing system 910 and/or screen buffer 914 and/or image output device 928, and, using image classifier 920 determines if image 902 is clean (922) or non-clean (926). Because image 902 was clean, no action is taken for the next input image (924). In some embodiments, the controlled image is removed and replaced by the recovered image 902 before the next input image is input into image input device 906. The net effect of this exemplary process is that image 902 would be not be visible for at least some time, or not visible at all, to a user of the selected computing device, but the next classified image would be treated as an "image (including an image that is non-clean) following one or a series of images classified as clean" as shown in FIG. 7.

FIG. 10 illustrates, in an exemplary system and method according to some embodiments, actions taken, when an image that is non-clean follows an image that is non-clean. Image 1002 represents an image that is classified as non-clean but follows an image which had been classified as non-clean. As can be seen in FIG. 10, image 1002 is input into image input device 1008 via 1006 then to windowing system 1012 via 1010. In some aspects, OAAS 1020 generates, or causes to be generated, an obscured image, or alternatively selects an image from a group of images available to windowing system 1012, and causes (1024) the windowing system 1012 to make a controlled image the topmost window in the z-ordering process of windowing system 1012. Alternatively, in some embodiments, if the non-clean image to be blocked, modified, or obscured is in a window that is not the topmost window, but is subordinate to a window that has only clean images (that is, a "clean window"), the window with the controlled image may be subordinate in the z-order to the clean window. In some embodiments, the controlled image is an alpha blended image. When alpha-blending is used to obscure image 1002, the alpha-blended image becomes the controlled image.

In some embodiments, windowing system 1010 implements appropriate actions to pass via 1014 the controlled image to screen buffer 1016, which in turn allows image output device 1026 to display the controlled image. In one aspect, when alpha-blending is used to create the controlled image, OAAS 1020 reverse-alpha blends the controlled image to recover image 1002 using data from screen buffer 1016 and/or image output device 1026, and, via output 1018 using image classifier 1022 determines if image 1002 is clean or non-clean. Because image 1002 is non-clean, the next image 1004 to be classified is treated again as said "image that is non-clean follows an image that is non-clean." The net effect of this exemplary process is that image 1002 would be not be visible to a user of the selected computing device, and also the next classified image 1004 would not be visible to a user of the selected computing device; in the event that image 1004 is clean, it would be treated as "a clean image following an image classified as non-clean" (FIG. 9). In some aspects, if image 1004 is non-clean, the image 1004 is treated as "an image that is non-clean follows an image that is non-clean" (FIG. 10).

Figure 11:
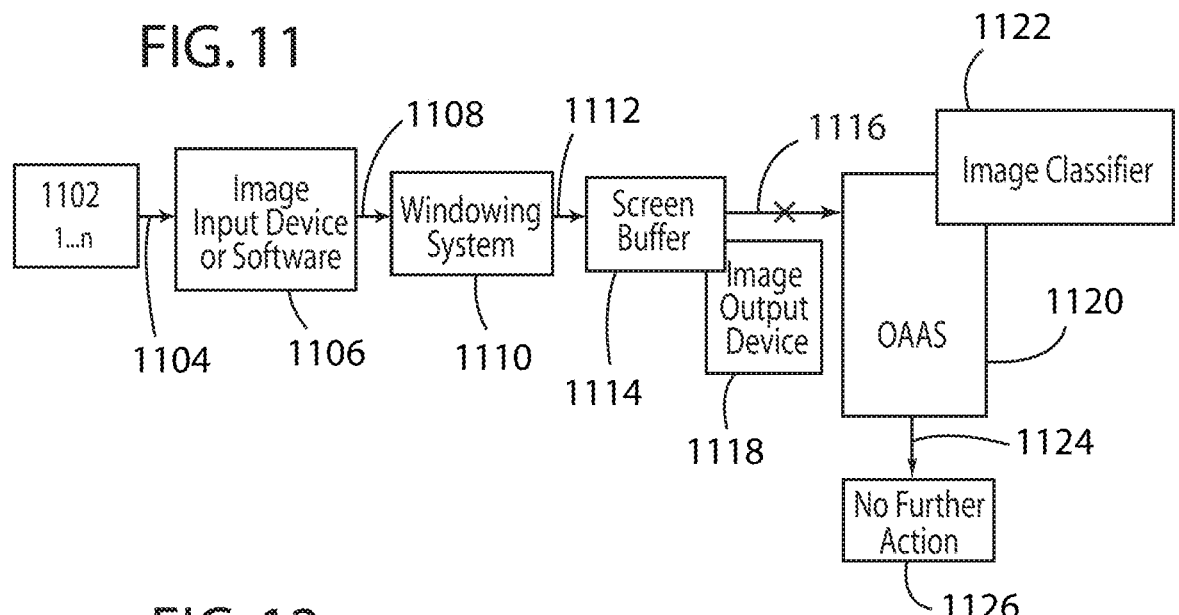
FIG. 11 illustrates an exemplary system according to the present embodiments, in which images are sampled, based on time and/or number of images, instead of analyzing and classifying every image.
Figure 12:
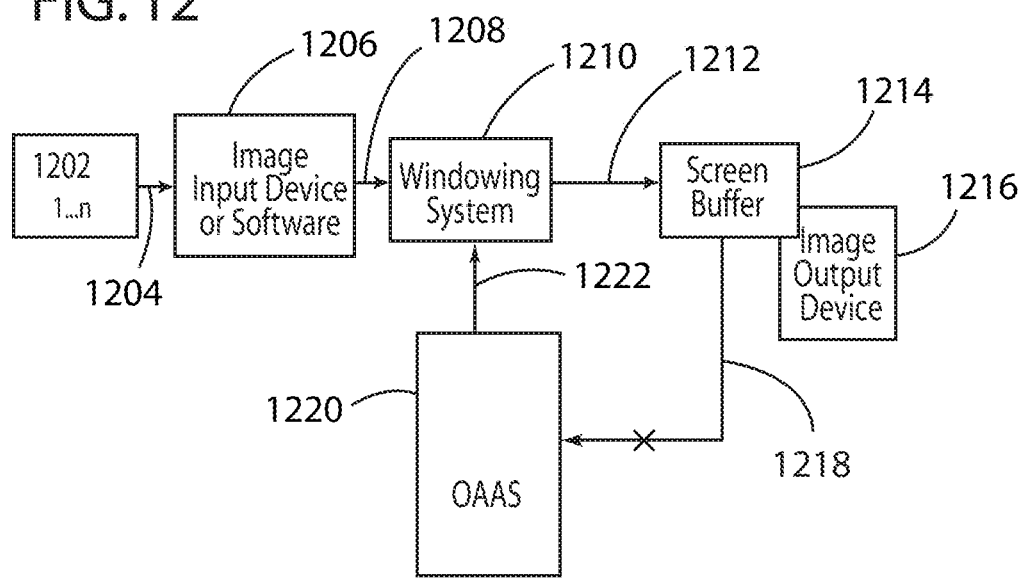
FIG. 12 illustrates an exemplary system according to the present embodiments where the last classified image was classified as non-clean.

FIGS. 11 and 12, illustrate exemplary systems and methods according to some embodiments, in which images are sampled, based on time and/or number of images, instead of analyzing and classifying every image. Here, it is possible that the image content could optionally come directly from the Image Input Device to the Screen Buffer without an intervening Windowing System.

FIG. 11 illustrates this system and method when the last classified image was classified as clean. In this example, a series of n images 1102 (say, $\{I_1, \ldots, I_n\}$) is input via 1104 into image input device 1106 then to windowing system 1110 via 1108. Images 1102 are a selection of images which follows a clean image, wherein n is based on the number of images or the amount of time allowed to pass without classifying them, and image $I_{n+1}$ is to be classified. Since, in this example of FIG. 11, the last (i.e., most recent) classified image was clean, all of images in 1102 are treated as a "clean image following one or a series of images classified as clean" as in FIG. 8. That is, in the embodiment shown in FIG. 11, images 1102 are input via 1104 into image input device 1106. Windowing system 1110 implements appropriate actions to pass images via 1112 to screen buffer 1114, which in turn allows image output device 1118 to display the images 1102. In some aspects, OAAS 1120 does not analyze nor take any other action (i.e., bypassed at 1116) on the images 1102. Because images 1102 are not analyzed by OAAS 1120 or its image classifier 1122, no further action 1126 via 1124 on images 1102 is taken. The net effect of the described process is that images 1102 would be visible to a user of the selected computing device, unobscured and unmodified by OAAS 1120. However, the image $I_{n+1}$ would then be treated as an "image (including an image that is non-clean) following one or a series of images classified as clean" as in FIG. 7.

FIG. 12 illustrates A system and method where the last classified image was classified as non-clean. In this example, a series of images 1202(1 . . . n) is input via 1204 into image input device 1206 then via output 1208 to windowing system 1210. Images 1202(1 . . . n) is a series of images, having 'n' images, where 'n' is a number predetermined based on the number of images or the amount of time allowed to pass without classifying them, and the "n+1th" image is to be classified. Since, in this example of FIG. 12, the last classified image was non-clean, all of images 1202(1 . . . n) are treated as "an image that is non-clean follows an image that is non-clean" as in FIG. 10. That is, in some embodiments, images 1202(1 . . . n) are input into image input device 1206. In one aspect, OAAS 1220 causes (via output 1222) windowing system 1210 to make a controlled image the topmost window in the z-ordering process of windowing system 1210. Alternatively, in some embodiments, if the non-clean image to be blocked, modified, or obscured is in a window that is not the topmost window, but is subordinate to a window that has only clean images (that is, a "clean window"), the window with the controlled image may be subordinate in the z-order to the clean window. In one aspect, the controlled image then is passed on via output 1212 to the screen buffer 1214 and image output device 1216 for viewing. In some embodiments, the controlled image is an alpha blended image. When alpha-blending is used to obscure images 1202(1 . . . n), the alpha-blended image becomes the controlled image. In some embodiments, windowing system 1210 implements appropriate actions to pass the controlled image to screen buffer 1214, which in turn allows image output device 1216 to display the controlled image. Images 1202(1 . . . n) are not analyzed (i.e., bypassed at 1218) by OAAS 1220, so the net effect is that images 1202(1 . . . n) will not be displayed to a user of the selected computing device, but the controlled image will be displayed instead. However, the "n+1th" image would then be treated either as "a clean image following an image classified as non-clean" as in FIG. 9 or "an image that is non-clean follows an image that is non-clean" as in FIG. 10.

FIG. 13A illustrates one exemplary process of alpha-blending and reverse alpha-blending as used in some present embodiments. Image 1302 is an image that is determined to be non-clean, and is to be blocked, modified, or obscured, and is input into image input device 1310 via output 1306, and then passed to windowing system 1314 via output 1312 for processing. In some embodiments, OAAS 1326 and image classifier 1324 generates, or causes to be generated, an obscured image, or alternatively selects an image from a group of images available to windowing system 1314 via 1328, said image to become the overlay image in the alpha-blending process, and causes (via output 1328) the windowing system 1314 to make a controlled image using the overlay window and image 1302 as the underlying window of the alpha-blending process. In one aspect, the windowing system 1314 causes the resulting controlled window to be the topmost window in the z-ordering process of windowing system 1314. Alternatively, in some embodiments, if image 1302 is in a window that is not the topmost window, but is subordinate to a window that has only clean images (that is, a "clean window"), the window with the controlled image may be subordinate in the z-order to the clean window. In such embodiments, the controlled image is an alpha blended image. In some aspects, this is accomplished by alpha-blending the overlay image with image 1302 in the windowing system, and the alpha-blended ("controlled") image is passed on via output 1316 to screen buffer 1318 and image output device 1322 for viewing by a user of the selected computer. The controlled image is then passed back (via output 1320) to OAAS 1326, and reverse alpha-blended to recover image 1302 for analysis and classification. Image classifier 1324 classifies the image as clean or non-clean for the purposes of determining future actions.

FIG. 13B illustrates the case wherein image 1302 is non-clean and would reside in the topmost window, and wherein windowing system 1314 causes the resulting controlled window of FIG. 13A to be displayed by Image Output Device 1322, (in this case for exemplary purposes, a rectangular window, though in some embodiments the window is non-rectangular) to be the topmost window in the z-ordering process of windowing system 1314. In this example, OAAS 1326 and/or windowing system 1314 identify the coordinates of the window 1336 to be blocked, modified, or obscured, those coordinates being identified as $x_1y_1$, $x_1y_2$, $x_2y_1$, and $x_2y_2$ (1342, 1344, 1340, 1338 respectively for FIG. 13B). The controlled window then occupies those coordinates as the topmost window 1336. Windows 1334 and 1332 are subordinate in the z order to the topmost window 1336.

FIG. 13C illustrates the case wherein the image 1302 is non-clean and would reside in a window that is not the topmost window, but is subordinate to a window that has only clean images (that is, a "clean window"). In this case, the window with the controlled image would be subordinate in the z-order to the clean window or windows. In some embodiments, windowing system 1314 causes the resulting controlled window (in this exemplary case, a rectangular window, though in some embodiments the window is non-rectangular) to be subordinate to the topmost window in the z-ordering process of windowing system 1314. In this example, window 1348 is a clean window, and is the topmost window in the z order. OAAS 1326 and/or windowing system 1314 identify the coordinates of the window to be blocked, modified, or obscured, those coordinates being identified as $x_3y_3$, $x_3y_4$, $x_4y_3$, and $x_4y_4$ (1356, 1358, 1354, 1360 respectively for FIG. 13C). As shown in FIG. 13C, the controlled window 1352 then occupies those coordinates, except as overlain by the topmost window 1348. Windows 1352 and 1350 are subordinate in the z order to the topmost window 1348. Here, window 1352 is a controlled image, while windows 1348 and 1350 are "clean windows." In some embodiments, the entire screen may comprise the topmost window.

Thus, as shown above, some of the current embodiments can include an obscuring and analysis system (OAAS), which automatically modifies and obscures (instead of modifies or obscures) an image if the previous analyzed image was found to be non-clean. This process can be repeated until a first clean image is found. While that first clean image (which follows a previous non-clean image) could still be obscured, the system and method could allow the next image (that is, the next image after the first clean image) to be viewed. The net effect is that a series of non-clean images may have only the first image viewed on a screen for a short time while modifying and obscuring the rest of the series. A clean image would be obscured only if the previous analyzed image was non-clean a series of clean images which follows a non-clean image would have only the first clean image obscured; a series of clean images with no non-clean images would not have any images obscured.

In one exemplary approach, systems and methods for monitoring use of a selected user may have a computing device having an image output device and also having an Obscuring and Analysis System (OAAS) installed thereon; wherein said OAAS may be software or hardware; wherein said computing device is capable of displaying images on a screen; wherein said screen may be a 2- or 3-dimensional view; wherein said OAAS is configured to receive content from an image classifier that is capable of classifying an input image (that is, an image that is displayed on said image output device) as "clean" or "non-clean" (such as an MLIC or other means of classifying images); wherein said OAAS is configured such that it may then obscure the classified image in a way (for instance, with an alpha-blending routine) that the original image is either completely blocked, or obscured in a way that the original image can be recovered (for instance, by using a reverse alpha-blending process and method); and wherein said OAAS is configured to obscure or block a next image before said next image is displayed, in a way (for instance, with an alpha-blending routine) that said next image is either completely blocked or obscured in a way that the original of said next image can be recovered (for instance, by using a reverse alpha-blending process and method); and wherein sequential images following a non-clean image may continue to be obscured or blocked until an image recovered and analyzed by the OAAS or image classifier is found to be clean, after which a next image is not obscured or blocked; and wherein said software may also generate a report on said images, or incorporate data and metadata about said images into a collection of data that may be included in a report.

In another exemplary approach, alpha blending (see attached definition of Alpha Blending), employing an overlay window, can be used when a displayed image (a "first" image, for this approach referred to as "image A") is classified by the OAAS or an image classifier as being "non-clean," such that the displayed image A is blocked or obscured by an OAAS, performing a fixed but known and reversible mathematical function on the data comprising the image A, and alpha-blending the image, thereby making the overlain image so heavily translucent (for example, a 95% alpha blend) that the underlying window (the "non-clean" image A) is undiscernible to the user. When an image A is thus classified as being non-clean, the OAAS automatically blocks or modifies and obscures, using alpha-blending, a next image B. Thus, the next image B is blocked or obscured before or when it is viewed, so it will not be visible for even a short time. When said next image B is obscured using alpha-blending, image B and the overlain image are then reverse alpha-blended to recover the underlying image B. If the underlying image of said next image B is classified (by the OAAS or the image classifier) as clean, the next image C is not blocked or obscured; however, if the underlying image of said next image B is classified as non-clean, then the next image C input into the image input device will again be automatically blocked or obscured. The process may be continued for each image input into the image input device. The image input device may be hardware in or communicatively connected to the computing device, or it may be a part of the computing device, and is configured to receive data that can be configured for output to a screen buffer and an image output device, such as a screen. The computing device may also be configured to store input images for an indefinite time before the images are called or otherwise scheduled for display. According to this and other exemplary approaches, when a series of images is thus analyzed, and a sequence of more than one of that series of images is classified as non-clean, the OAAS may be configured to choose only selected non-clean images to alpha-blend such that the underlying image can be recovered; for instance, after the first non-clean image A, the OAAS may completely block the next 5 images and alpha-blend the 6th image for recovery; in such a case, the first 5 images would not be classified, but the 6th image would be classified to determine the next actions. The intent of this approach is to minimize exposure to detected "non-clean" images. An additional advantage is that it also decreases computational power and battery power required, when images 2-5 have a propensity to also be "non-clean." In any event, the results of the analysis, along with metadata about the underlying and overlay images, may be passed to a reporting agent. While the user may be unable to ascertain the underlying image, an application with full knowledge of the overlay image (that is, the OAAS) can reverse the mathematical function to recover the image of interest.

According to another approach, when a non-clean image is obscured as in the second exemplary approach, another (that is, the "new," or next sequential in time) image (said image which may be stored on the computing device) can be accessed by the computing device and displayed on the device's screen with the same obscuring process (OAAS) as in the second exemplary approach. In this approach, the "new" image is automatically obscured by the OAAS, but the OAAS recovers the new image (by un-doing the obscuring process, for instance by a reverse alpha-blend calculation, un-doing the mathematical function that accomplished the obscuring), but displaying instead the obscured image, the OAAS analyzes the recovered image without displaying it. If that un-modified un-obscured image is "non-clean," the OAAS repeats this process; if that image is clean, it allows or causes the next image (that is, a new "new" image, or the next sequential in time) to be viewed on the screen without modifying or obscuring it. The intent of this approach is that if a first image is found to be non-clean it is obscured, and regardless of whether the next (a second) image is clean or non-clean, it is automatically obscured so that it is undiscernible to the user; then, the underlying second image is analyzed by reverse alpha-blending; if it is non-clean, then the next (that is, a third) image is also obscured and modified, and the process is repeated; if it is clean, then the next (that is, a third) image is allowed to be viewed without obscuring. In this approach, the OAAS can continuously monitor the underlying image-producing applications or sources while the user has no knowledge of the obscured images, or of the underlying application user interface elements. In any event, the results of the analysis of each image, along with metadata about the underlying and overlay images, may be passed to a reporting agent.

According to another approach, when it is determined that an alpha-blended (controlled) image is to be displayed, the OAAS can cause the windowing system to have the alpha-blended image be the topmost window in the z-order of the windowing system, as an overlay over the actual image; the actual image is also displayed, but as an underlying window to the alpha-blended image. In this exemplary approach, the OAAS may determine the coordinates of the actual image that would otherwise be displayed, and cause the alpha-blended image to overlay the actual image, either using exactly the same coordinates or other coordinates as necessary to cause the actual image to be obscured.

According to another approach, images input into a windowing system may exist in one or more separate windows that are displayed along with unrelated windows, with the z-order of those windows being determined by the windowing system, said windows which are analyzed individually by the OAAS. In this exemplary approach, each window, or portions of each window displayed is considered to be an image for the purposes of the present embodiments. In some embodiments of this exemplary approach, one or more windows may be blocked, modified, or obscured while others remain unblocked, unmodified, and unobscured; in those embodiments, the determining of z-order by a windowing system may result in the unblocked, unmodified, and unobscured window or windows becoming or remaining as the topmost window or windows, with the blocked, modified, or obscured window or windows being subordinate to said topmost window or windows in the Z-order; in those embodiments, the window containing the image to be blocked, modified, or obscured is replaced by a controlled image that may or may not be subordinate to the topmost window or windows. In some further embodiments, if an image on the screen is to be blocked, modified, or obscured, the entire screen is replaced with a controlled image, with only the window containing the image to be blocked, modified, or obscured being replaced by an image that appears different from the original image, while the remainder of the screen (which shows images not to be blocked, modified, or obscured) becomes part of the controlled image; the effect of these further embodiments is to give the appearance that only the portion of the screen containing the image to be blocked, modified, or obscured is changed while the remainder of the screen is unchanged, even though in reality the entire screen is the controlled image; in those embodiments, the user of the selected computing device may have the option to take further action to unblock, unmodify, or unobscured the entire screen, or to close the window containing the portion of the screen containing the image to be blocked, modified, or obscured, or to take other action.

According to another approach, one or more of the other exemplary approaches above can be used to block, modify, and/or obscure input images. In some cases of this exemplary approach, input images may be stored on the computing device for an indefinite time, and may be called for display or scheduled for display. Input images that are stored on the computing device may also be available for viewing from time to time, such as a video stored on a hard drive. The results of the analysis of each image, along with metadata about the underlying and/or overlay images, may be passed to a reporting agent.

In another exemplary approach, any of the previously mentioned exemplary approaches above may be used to block, modify, and/or obscure pornographic or otherwise objectionable images.

In an yet another exemplary approach, when a controlled image is displayed on an image output device, said controlled image, consisting of an original (underlying) image and an obscuring (overlay) image, may be viewed through another computing device (which has image input and image output capability) such that the original image is recovered on that other computing device. For instance, a computer screen may be viewable by a user wearing goggles that have the capability of viewing, reverse alpha-blending, and displaying the recovered image.

While the embodiments have been described in conjunction with specific embodiments, it is evident that many alternatives, modifications and variations will be apparent to those skilled in the art in light of the foregoing description. Accordingly, the present embodiments attempt to embrace all such alternatives, modifications and variations that fall within the spirit and scope of the appended claims. Throughout this specification and the drawings and figures associated with this specification, numerical labels of previously shown or discussed features may be reused in another drawing figure to indicate similar features.

We claim:

1. A system for monitoring image input of a computing device, comprising:
   a computing device including a control circuit having a programmable processor, the computing device being configured to receive images and to output the received images to an image output device coupled to the computing device;
   wherein the computing device is configured to monitor the received images via the programmable processor of the computing device being programmed using a Machine Learning Image Classification (MLIC) algorithm configured to determine a score of at least one received image within a predetermined criteria for classifying said at least one received image as a restricted subject image, and, wherein said programmable processor of said computing device is programmed, based on said determination of said score by said programmable processor, to generate a modify or non-modify command with respect to said at least one received image; and
   wherein in response to said at least one received image being scored by said programmable processor within the predetermined criteria, the programmable processor is programmed to generate a command to output said at least one received image as a modified image to the image output device;

wherein said programmable processor is further programmed, based on said modify command by said programmable processor, to display the modified image in a first window that is subordinate to a second window without a modified image, such that the first window is obscured by the second window;

wherein said classifying is based on a threshold and this threshold is imposed on a system user by a third party; and wherein when said at least one received image is greater than two images from a single source, these greater than two images are scored separately, and the presence of multiple restricted subject images will result in a determination that the single source is to be blocked or reported upon.

2. The system of claim 1, wherein the output of the modified image to the image output device based on said modify command by said programmable processor is selected from the group consisting of altered, replaced, obscured, blocked, overlaid, and combinations thereof of the at least one received image.

3. The system of claim 2, wherein said programmable processor is further programmed, based on said modify command by said programmable processor, to generate a command selected from the group consisting of: a command to modify audio output of said computing device, a command for said computing device to sound an audible alarm, a command to generate a report, a command to power off said computing device, and combinations thereof.

4. The system of claim 1, wherein said programmable processor of said control circuit of said computing device is programmed to continuously monitor image input and to generate a command for the image modification to cease upon a determination by said programmable processor that said at least one received image scored within the predetermined criteria.

5. The system of claim 1, wherein the score determined by said programmable processor of said control circuit of said computing device is at least one of a relative, numerical, alphabetical, and/or symbolic score.

6. The system of claim 5, wherein said score determined by said programmable processor of said control circuit of said computing device is numeric and scaled from 0 to 100, and wherein said programmable processor of said control circuit of said computing device is programmed to issue said command when said at least one received image is scored above a predetermined score between 0 and 100.

7. The system of claim 3, wherein said received image is selected from the subject domains of pornography, medical imagery, diagnostic imagery, seismic data, or from any other subject domain.

8. The system of claim 1, wherein said computing device is a cluster of devices including at least one of individual computers, remote servers, other devices capable of communicating interactively with said computing device, and/or mobile devices.

9. The system of claim 1, wherein said received images are at least one of still pictures, videos, streaming videos, 3-D images, holographic, virtual reality, and analog images.

10. The system of claim 9, wherein said received images are video images and wherein said programmable processor of said control circuit of said computing device is programmed to determine a score of said video images via a capture of sequential images of the video at predetermined time intervals in the range of 1 milliseconds to 10,000 milliseconds; and wherein said score for said video images determined by said programmable processor of said control circuit of said computing device is based on images or portions of video images preceding said captured sequential images.

11. The system of claim 1, wherein said programmable processor of said control circuit of said computing device is programmed to cause analog image data to be converted to digital data, and to analyze said digital data.

12. The system of claim 1, wherein said programmable processor of said control circuit of said computing device is programmed to capture metadata associated with said received images, and wherein said programmable processor of said control circuit of said computing device is programmed to process said metadata via said MLIC algorithm to determine said score for said received images.

13. The system of claim 12, wherein said metadata includes at least one of filename, timestamp, title, description, tags, source code, and hash.

14. The system of claim 3, wherein said command to generate said report contains at least one of said score, metadata, image, modified image, replacement image, display of a list of recorded image access activity sorted by said score, display of a list of recorded image access activity sorted chronologically, and no image.

15. The system of claim 1, wherein said received images comprise at least one of: screen data; data of image files stored in the memory of said computing device; data sent from a device capable of sending images; data from an HDMI processor; data sent from a device capable of sending videos; data sent from a device capable of sending analog images; data sent from a device capable of sending n-dimensional images (where n is a number greater than 2); data sent via Internet; data sent via Intranet; data from a camera; data from another computing device; data from a remote server; data from a Virtual Private Network; and data from a scanner.

16. The system of claim 1, wherein the MLIC Algorithm is a convolutional neural network (CNN).

17. The system of claim 1; wherein the restricted subject image is pornography.

18. The system of claim 1, wherein the window without a modified image comprises screen data.

19. The system of claim 1, wherein the received images comprise a series of images, and wherein said at least one received image is one of the images in the series, and wherein in response to said at least one received image of the series of images being scored by said programmable processor within the predetermined criteria, the programmable processor is programmed to classify the series of images as restricted subject images.

20. A system for monitoring image input of a computing device, comprising:
    a computing device including a control circuit having a programmable processor, the computing device being configured to receive images and to output the received images to an image output device coupled to the computing device;
    wherein the computing device is configured to monitor the received images via the programmable processor of the computing device being programmed using a Machine Learning Image Classification (MLIC) algorithm configured to determine a score of at least one received image within a predetermined criteria for classifying said at least one received image as a restricted subject image, and, wherein said programmable processor of said computing device is programmed, based on said determination of said score by said programmable processor, to generate a modify or non-modify command with respect to said at least one received image; and wherein in response to said at least one received image being scored by said programmable processor within the predetermined criteria, the programmable processor is programmed to generate a command to output said at least one received image as a modified image to the image output device, wherein said programmable processor is further programmed, based on said modify command by said programmable processor, to generate a command to power off said computing device; and wherein said classifying is based on a threshold and this threshold is imposed on a system user by a third party; and wherein when said at least one received image is greater than two images from a single source, these greater than two images are scored separately, and the presence of multiple restricted subject images will result in a determination that the single source is to be blocked or reported upon.

\* \* \* \* \*